United States Patent
Hu et al.

(10) Patent No.: US 8,825,370 B2
(45) Date of Patent: Sep. 2, 2014

(54) INTERACTIVE MAP-BASED TRAVEL GUIDE

(75) Inventors: Jianing Hu, Sunnyvale, CA (US); Pasha Sadri, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1160 days.

(21) Appl. No.: 11/263,623

(22) Filed: Oct. 28, 2005

(65) Prior Publication Data

US 2006/0271277 A1 Nov. 30, 2006

Related U.S. Application Data

(60) Provisional application No. 60/685,252, filed on May 27, 2005.

(51) Int. Cl.
*G01C 21/00* (2006.01)

(52) U.S. Cl.
USPC ........... 701/408; 701/438; 701/533; 701/425; 701/429; 701/455; 340/995.1; 340/995.14; 340/995.16; 340/995.19; 340/995.24; 707/999.005; 707/999.01; 707/999.1; 707/999.102

(58) Field of Classification Search
USPC .......... 701/201, 208, 211, 408, 533, 455, 480
See application file for complete search history.

(56) References Cited

U.S. PATENT DOCUMENTS

| | | | |
|---|---|---|---|
| 5,802,492 A | 9/1998 | DeLorme et al. | |
| 5,818,455 A | 10/1998 | Stone et al. | |
| 5,884,218 A | 3/1999 | Nimura et al. | |
| 5,948,040 A * | 9/1999 | DeLorme et al. | 701/426 |
| 6,148,260 A | 11/2000 | Musk et al. | |
| 6,240,360 B1 | 5/2001 | Phelan | |
| 6,297,748 B1 | 10/2001 | Lappenbusch et al. | |
| 6,307,573 B1 | 10/2001 | Barros | |
| 6,321,158 B1 | 11/2001 | DeLorme et al. | |
| 6,405,129 B1 | 6/2002 | Yokota | |
| 6,430,602 B1 | 8/2002 | Kay et al. | |
| 6,493,630 B2 | 12/2002 | Ruiz et al. | |
| 6,772,142 B1 | 8/2004 | Kelling et al. | |
| 6,836,270 B2 | 12/2004 | Du | |

(Continued)

FOREIGN PATENT DOCUMENTS

WO    WO 01/35600 A2 * 10/2000

OTHER PUBLICATIONS

Delorme, Inc. (2002). "Street Atlas USA 2003 User Guide," The Apache Software Foundation, 1999-2000, located at <http://support.radioshack.com/support_computer/doc69/69511.pdf>, pp. 1-141.

(Continued)

*Primary Examiner* — Redhwan k Mawari
(74) *Attorney, Agent, or Firm* — James J. DeCarlo; Greenberg Traurig, LLP

(57) ABSTRACT

A trip planner is provided for creating, modifying, categorizing, and sharing online trip plans. A trip plan includes a list of items such as hotels, restaurants, and tourist attractions selected from a travel guide or provided by a user. An item can have a street address for positioning the item on a map, an image and description of the item, and other metadata assigned by the user, such as tags and notes. The trip planner can generate an itinerary listing the items, and a corresponding map showing the locations of the items. A trip plan can be shared with other users, who can locate the trip plan by searching for the tags or other metadata.

22 Claims, 30 Drawing Sheets

(56) References Cited

U.S. PATENT DOCUMENTS

| | | | |
|---|---|---|---|
| 7,092,892 | B1 | 8/2006 | Sobalvarro et al. |
| 7,249,160 | B2 | 7/2007 | Nozaki et al. |
| 2002/0067379 | A1 | 6/2002 | Kenyon et al. |
| 2002/0091535 | A1* | 7/2002 | Kendall et al. ............... 705/1 |
| 2002/0105532 | A1* | 8/2002 | Oblinger ............... 345/701 |
| 2002/0116336 | A1 | 8/2002 | Diacakis et al. |
| 2003/0083073 | A1 | 5/2003 | Cossins et al. |
| 2003/0093419 | A1 | 5/2003 | Bangalore et al. |
| 2003/0182052 | A1* | 9/2003 | DeLorme et al. ............ 701/201 |
| 2004/0044469 | A1 | 3/2004 | Bender et al. |
| 2004/0059659 | A1 | 3/2004 | Safaei et al. |
| 2004/0073538 | A1 | 4/2004 | Leishman et al. |
| 2004/0148207 | A1* | 7/2004 | Smith et al. ............... 705/6 |
| 2005/0027705 | A1 | 2/2005 | Sadri et al. |
| 2005/0138631 | A1* | 6/2005 | Bellotti et al. ............... 719/310 |
| 2005/0187961 | A1* | 8/2005 | Yokota et al. ............... 707/102 |
| 2005/0268254 | A1 | 12/2005 | Abramson et al. |
| 2006/0026170 | A1 | 2/2006 | Kreitler et al. |
| 2007/0165332 | A1 | 7/2007 | Wailes et al. |

OTHER PUBLICATIONS

HORNBAEK, K. (Dec. 2002). "Navigation Patterns and Usability of Zoomable User Interfaces With and Without an Overview," *ACM Tranactions on Computer-Human Interaction* 9(4):362-289.

International Search Report and Written Opinion mailed on Mar. 6, 2007, for PCT Application No. PCT/US2006/040270 filed Oct. 13, 2006, 12 pages.

International Search Report and Written Opinion mailed Jan. 22, 2008, for PCT Application No. PCT/US06/19223, 10 pages.

Cederoth, R.A. et al. (Aug. 19, 2004). "Expedia, Inc.'s Third Supplemental Objections and Responses to Civix's First Set of Interrogatories," Civix-DDI, LLC v. Cellco Partnership d/b/a Verizon Wireless, Expedia, Inc., Travelscape, Inc., and Verizon Information Services, Inc., United States District Court for the Northern District of Illinois, Eastern Division, Case No. 03-C-3972, 12 pages.

Cederoth, R.A. et al. (Feb. 28, 2005). "Travelscape, Inc.'s Sixth Supplemental Objections and Responses to Civix's First Set of Interrogatories," Civix-DDI, LLC v. Expedia, Inc., Travelscape, Inc., and Verizon Information Services, Inc., United States District Court for the Northern District of Illinois, Eastern Division, Case No. 03-C-3972, 28 pages.

Chefitz, J. et al. (May 4, 2005). "Verizon Information Services's Second Supplemental Objections and Response to Civix's Interrogatory No. 3," Civix-DDI, LLC v. Expedia, Inc.; Travelscape, Inc.; and Verizon Information Services, Inc., United States District Court for the Northern District of Illinois, Eastern Division, Case No. 03-C-3972, 7 pages.

Expedia, Inc. (2003). "Expedia.comm®," located at <http://www.expedia.com/pub/agent.dll?qscr=htfv&itid=&itdx=&itty=&from=f>, last visited on May 5, 2003, 6 pages.

Expedia, Inc. (2006). "Expedia.com," located at <http://www.expedia.com/Defaultasp?CCheck=1&>, last visited Nov. 2, 2006, 2 pages.

GIS Development.net. (Date Unknown). "GDT and TrafficCast to Deliver Real-Time Traffic Information", located at <http://www.gisdevelopment.net/news/viewn.asp?id=GIS:N_ezpcygua...>, last visited on Feb. 14, 2005, 2 pages.

Hrut, C.B. (Sep. 21-22, 1993). "Navigation Technologies: Executive Summary," *Mobile World Conference Proceedings*, 22 pages.

TrafficCast, Inc. (Date Unknown). "The Power of Prediction™: Add Value", located at <http://www.trafficcast.com/index.html>, last visited on Feb. 14, 2005, 1 page.

TrafficCast, Inc. (Date Unknown). "The Power of Prediction™: Company Vision", located at <http://www.trafficcast.com/corporate/about.html>, last visited on Feb. 14, 2005, 1 page.

TrafficCast, Inc. (Date Unknown). "The Power of Prediction™: Data Products and Services", located at <http://www.trafficcast.com/services/service.html>, last visited on Feb. 14, 2005, 1 page.

TrafficCast, Inc. (Date Unknown). "The Power of Prediction™: Market Segments", located at <http://www.trafficcast.com/services/Marketseg.html>, last visited on Feb. 14, 2005, 1 page.

TrafficCast, Inc. (Date Unknown). "The Power of Predictionim™: Markets with Real Time Traffic Data", located at <http://www.trafficcast.com/slides/TrafficCastTTAMarket.html>, last visited on Feb. 14, 2005, 3 pages.

TrafficCast, Inc. (Date Unknown). "The Power of Prediction™: Partnerships and Customers", located at <http://www.trafficcast.com/Customers/index.html>, last visited on Feb. 14, 2005, 4 pages.

TrafficCast, Inc. (Date Unknown). "The Power of Prediction™: Personalized Travel-Time Reports", located at <http://www.trafficcast.com/demonstrations/reports/text/alerts.html>, last visited on Feb. 14, 2005, 1 page.

TrafficCast, Inc. (Date Unknown). "The Power of Prediction™: Products and Services", located at <http://www.trafficcast.com/services/index.html>, last visited on Feb. 14, 2005, 1 page.

TrafficCast, Inc. (Date Unknown). "The Power of Prediction™: Time-Dependent Routing", located at <http://www.trafficcast.com/demonstrations/routing/time_dependant/pre_trip_planning.html>, last visited on Feb. 14, 2005, 2 pages.

TrafficCast, Inc. (Date. Unknown). "The Power of Prediction™: TrafficCast Demonstrations", located at <http://www.trafficcast.com/demonstrations/index.html>, last visited on Feb. 14, 2005, 1 page.

TrafficCast, Inc. (Date Unknown). "The Power of Prediction™: TrafficCast Value Proposition", located at <http://www.trafficcast.com/services/valueprop.html>, last visited on Feb. 14, 2005, 1 page.

TrafficCast, Inc. (Date Unknown). "The Power of Prediction™: TrafficCast Speed Map", located at <http://www.trafficcast.com/demonstrations/maps/smartmap.html>, last visited on Feb. 14, 2005, 1 page.

\* cited by examiner

FIG. 6

600 — 
602 — Travel > Trip Planner (Beta) > My Trips > New Test Trip (11 days) > Add New Item    Send us feedback
606 — Trip* [New Test Trip]
610 — Category* [Other]
614 — Name* [My User-Defined "Other" Item]
(e.g., Hilton Bora Bora, Monk's Coffeshop)
618 — Web site URL [http://www.yahoo.com]
622 — Description [Sample Description for New Item]
626 — Phone number [User-entered Phone Number]
630 — Enter an address for your item to see it on a map (available in U.S. and Canada)
634 — Address [701 1st Ave.]
638 — City [Sunnyvale]
Enter a city name to sort your trip items by location.
642 — State/Province [CA]
Zip/Postal Code [94089]
Country [USA]
650 — [Add Item] [Cancel]

Travel > Trip Planner (Beta) > My Trips > New Test Trip (11 days)

Select a View: List View | Map View | Print View

Refine list by:
Location
San Francisco (7) — 2008
Santa Clara (1)
San Jose (3)
Sunnyvale (1)

Category
Map (1) — 2010
Shopping (1)
Things To Do (3)
Hotel (2)
Restaurant (4)
Other (1)

Tags ( what's this? )
First Tag (3)
Second Tag (5)
Fourth Tag (2)
Fourth Tag Fifth Tag (1)
Sixth Tag (1)
Five Hundredth Tag (1)
Seven Hundredth Tag (1)
Third Tag (1)

2000

Sort by: Date Added ▼ | Schedule | Tag

Thu 05/26/05 — 2004

San Francisco Map
Category: Map
San Francisco, CA, US — 2006
[ View ][ Delete ]

[ Edit notes ]
[ Edit tags ]

Soko Hardware
Category: Shopping
+1 415 931 5510
1698 Post St
San Francisco, CA 94115-3604
United States
[ View ][ Map It ][ Delete ]
The name is misleading for this split-level store that looks like it should be in a side street of the Ginza. There are a few hardware items tucked away in the back, but mostly what you will ...

[ Edit notes ]
[ Edit tags ]
[ Add dates ]

2002

Golden Gate Park
Category: Things To Do
+1 415 831 2700
Stanyan and Fulton streets
San Francisco, CA 94118
United States
[ View ][ Map It ][ Delete ]
In the late 1800s, a Scotsman named John McLaren transformed more than 1,000 acres of sand dunes into a wondrous haven in the midst of busy city life. Stretching from Stanyan Street to the Pacific...

Calendar:
| S | M | T | W | T | F | S |
|---|---|---|---|---|---|---|
| Jun | 19 | 20 | 21 | 22 | 23 | 24 | 25 |
| Jun | 26 | 27 | 28 | 29 | 30 | 1 | 2 |
| Jul | 3 | 4 | 5 | 6 | 7 | 8 | 9 |
| Jul | 10 | 11 | 12 | 13 | 14 | 15 | 16 |
| Jul | 17 | 18 | 19 | 20 | 21 | 22 | 23 |

Create a new item:
Hotel
Restaurant
Things To Do
Entertainment
Shopping
Other

Related information:
San Francisco
Overview, Things to do, Hotel Guide, Restaurants, Shopping, Entertainment, Slideshow
Santa Clara
Overview, Things to do, Hotel Guide, Restaurants, Shopping, Entertainment
San Jose, CA
Overview, Things to do, Hotel Guide, Restaurants, Shopping, Entertainment, Slideshow

INTERACTIVE MAP-BASED TRAVEL GUIDE

This application claims the benefit of U.S. Provisional Application Ser. No. 60/685,252, filed May 27, 2005.

BACKGROUND

1. Field of Invention

This relates generally to methods and systems for planning trips and creating travel guides, and in one example for planning trips and creating user specific travel guides within a browser environment.

2. Description of the Related Art

At its best, trip planning can be fun, exhilarating, and educational. Travelers take pleasure in the planning process, treating it as an extension to the act of discovery, an integral part of the travel experience. Planning a trip may also be a time-consuming and stressful affair. Making the best decisions for how to spend precious vacation days generally requires a traveler to seek-out and digest a wide array of travel resources and keep track of a myriad of useful information and trip details. Travelers may talk to friends, make trips to the library, pore over guide books, magazines, and newspapers, perform countless web searches, review websites to gather insight and advice, comparison shop online and offline, discuss plans with travel companions, and agonize over various decisions. As online travel resources become more abundant, the traveler feels increasing responsibility to research and find the best places and the best deals, further increasing the planning burden.

When gathering information for a trip, most travelers use a generic commercial guidebook and supplement with an assortment of paper (e.g., e-ticket confirmation itinerary, newspaper or magazine clippings, printouts of web pages, articles, and maps).

SUMMARY OF THE INVENTIONS

Exemplary methods and systems described herein may ease the hassle of planning a trip and make the trip planning process more enjoyable and convenient. In some examples, a user can select and store the ideas he encounters while researching a trip into a personal trip plan which may be viewed online, printed out to take with him on the user's journey, and share with others. This trip plan may also be used to commemorate a particular trip and can be used to associate trip pictures, user reviews, and other user data to the trip or individual items stored in the trip.

According to various aspects described herein, the exemplary methods and system includes features that enable trip planners to collect, organize, and access personal information in an easy and intuitive way and share a travel experience with others on a selective basis.

Exemplary methods and systems described herein may enable a user to collect and organize online and offline travel content in a way that is more easy, time saving, barrier-free, and valuable as to be compellingly better than a generic commercial guidebook and assortment of paper resources.

According to one aspect provided herein, methods and systems are provided for creating, editing, and storing a collection of information related to a planned or previous trip. In one example, a system includes creating a trip plan and adding items (e.g., maps, media objects, images, text, URL's, saved searches, local listings, etc.) to the trip plan. Additionally, a user may add tags to an item, where the items may then be sorted based on the tags. Also, the system may suggest tags to a user based on previously used tags by that particular user or other users.

According to another aspect, days (e.g., day 1, 2, 3, and so on) or dates (June $1^{st}$, June $2^{nd}$, and so on) may be associated with one or more items collected for a trip plan. In one example, the days or dates may be associated with an item by drag and drop functions, e.g., dragging and dropping an item to a calendar day or date.

According to another aspect, map views of the trip may be provided within the user interface. In one example, the map view may be overlaid with items (e.g., associated with locations such as the destinations, hotels, restaurants, etc.) for easy reference by a user. When multiple items are shown too close to be easily distinguished a zoom function may be included to zoom in on selected areas of the map. Alternatively, a multiple overlay function may be included.

According to another aspect, trip plans may be saved by a user to a local source (e.g., user computer) or remote source (e.g., online storage account, or the like). A map, including travel plans and item locations, may be saved to the trip for later reference. In one example, the map is saved and treated by the system as an item of the trip.

According to another aspect, a Bookmarklet is included which enables clipping to the user. A user may add a new item to the travel plan from the Bookmarklet. Additionally, a user may parse phone number, address, etc. from either highlighted text or page.

According to another aspect, promotions or recommendations may be made to the user based on, e.g., information collected or saved into the trip plan. Additionally, promotions or recommendations may be made based on the user's profile (for examples where a user must log-in and register, for example).

According to another aspect, entire trip plans may be shared publicly or within user defined groups or contact lists. The user may easily select their preferences for sharing trips at various levels. Such shared trip plans may be go through an approval process (e.g., to block "promoters"). Other users may rate the trip plans and/or content associated therewith, and rankings for helpfulness, accuracy, etc., may be created to assist users in finding existing trip plans. Other users may search for the trip plans by tag.

In general, in a first aspect, the invention features an apparatus for generating an interactive trip plan viewable by a user. The apparatus includes logic for providing a list of destinations to the user, logic for adding a trip plan item to the trip plan, wherein the trip plan item is based upon a destination selected by the user from the list, and logic for receiving metadata from the user concerning the trip plan item.

Embodiments of the invention may include one or more of the following features. The list may comprise a list of hotels, tourist attractions, restaurants, or combinations thereof. The list may comprise a destination provided by the user. The list may comprise a destination provided by a travel guide. The list may comprise a destination parsed from selected text on a web page. The metadata may comprise a tag, a note, a description, a category, or a combination thereof. The apparatus may also include logic for generating a schedule view of the trip plan, where the schedule view includes the trip plan item. The schedule view may be sorted by the metadata associated with the trip plan item. The apparatus may include logic for refining the schedule view of the trip plan to generate a refined view, where the refined view includes the trip plan item only if the metadata associated with the trip plan item has a user-specified value.

The apparatus may also include sharing logic for providing the trip plan to a set of users, where the trip plan is associated with a tag, and the trip plan can be retrieved by searching for the tag. The set of users may be a proper subset of all users of the apparatus. The apparatus may also include logic for causing the display of promotional items based upon the trip plan. The promotional items may comprise hotels within a defined distance of the trip plan item, airline flights associated with the location of the item, or combinations thereof. The apparatus may also include logic for generating a map view of the trip plan, where the map view includes a representation of the trip plan item displayed on the map in a position based upon an address associated with the trip plan item. The representation may be an icon. A single icon may be displayed for at least two trip plan items if the at least two trip plan items are located in a region of less than a defined area. The apparatus may also include map detail logic for receiving selection by a user of a trip plan item displayed on the map where the map detail logic can add details concerning the trip plan item to the map view. The apparatus may also include map item selection logic for receiving selection by a user of a travel guide item displayed on the map, where the map item selection logic can add the travel guide item to the trip plan. The apparatus may also include map saving logic for adding the map view to the trip plan. The apparatus may also include logic for generating a print view of the trip plan, where the print view includes a trip plan item, and the print view is in a format suitable for printing on paper.

BRIEF DESCRIPTION OF THE DRAWINGS

FIG. 6 illustrates an exemplary process for adding a new item to a trip plan.

FIG. 14 illustrates an exemplary process of refining by category.

FIG. 20 illustrates an exemplary trip plan including a saved map as an item.

FIG. 22 illustrates an exemplary result of clicking on "Y! Trip Planner" link in toolbar.

FIG. 23 illustrates an exemplary schedule portion of a print view screen.

DETAILED DESCRIPTION OF THE INVENTION

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

Various aspects and examples are described herein with reference to Yahoo!® travel. It will be recognized by those of ordinary skill in the art that aspects and examples provided may be applied to other similar and dissimilar travel and map applications. Additionally, co-pending and co-assigned U.S. patent application Ser. No. 10/849,083, entitled, "MAPPING METHOD AND SYSTEM", filed May 19, 2004, describes various exemplary method and systems relating to maps and the use of similar systems in a browser environment, and is hereby incorporated by reference as if fully set forth herein.

Figure 1A:
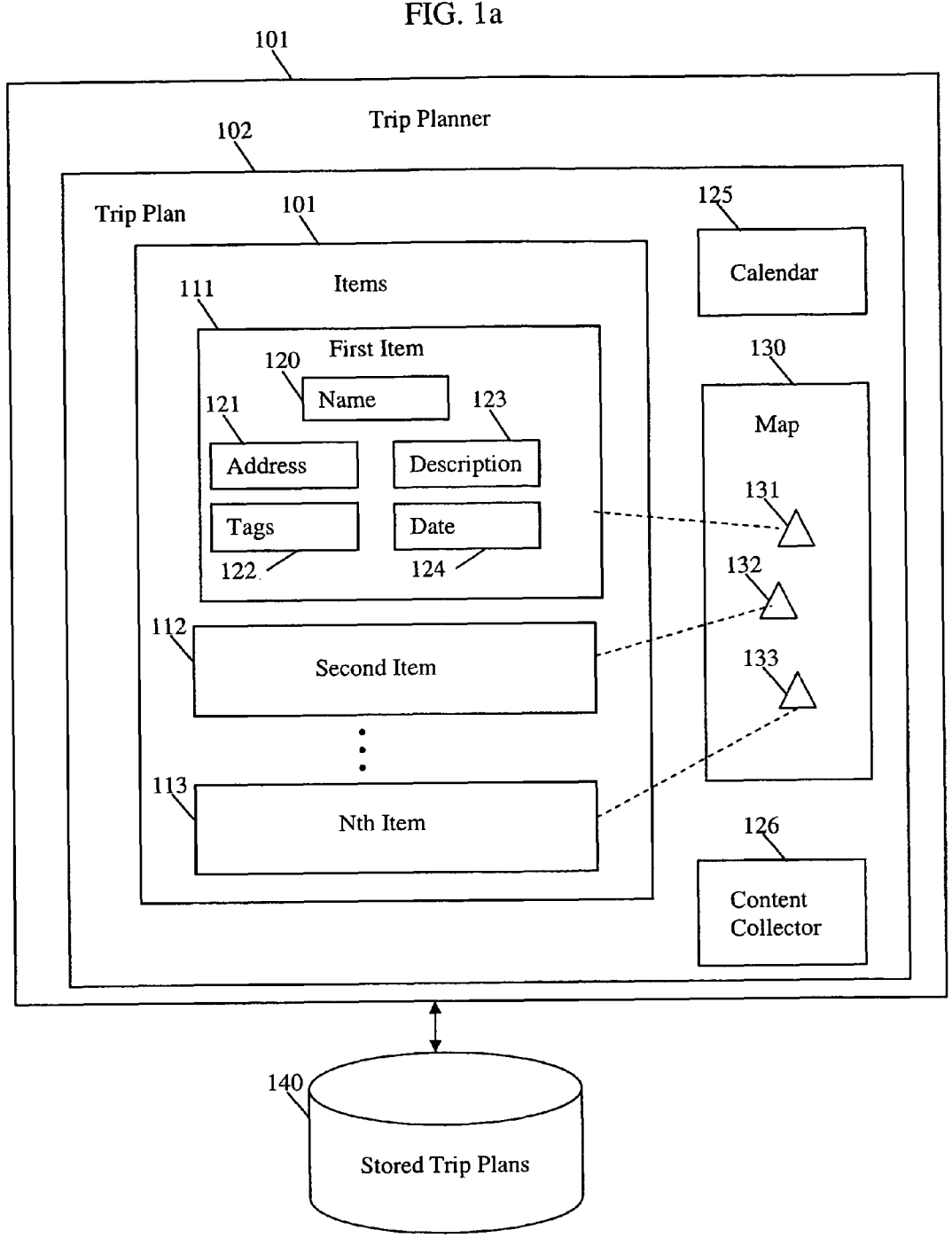
FIG. 1a illustrates an exemplary trip planner.

FIG. 1a is an illustrative drawing of a trip planner according to one embodiment of the invention. A trip planner 101 allows a user to create a trip plan 102. The trip plan 102, which includes a collection of content pertaining to an upcoming or past trip. The collection of content is represented as a set of items 103. Three items are shown: a first item 111, a second item 112, and an Nth item 113. In general, there may be any number of items in the items set 103. Each item includes optional metadata attributes, which may include a name 120, an address 121, a set of tags 122, a description 123, a date 124, and a category (not shown). The category classifies the item and may be a category such as "Things to Do" or "Restaurants". The date 124 may be a particular date, e.g. Jan. 1, 2005, or a day number, e.g. day 3, representing the third day of a trip. The tags 122 include at least one tag, where each tag is a word or string of text describing some aspect of the item. For example, a tag "Casino" could be associated with casino items to allow quick lookup of casinos, and a tag "Favorite" could be associated with a user's favorite items to allow the favorite items to be quickly looked up or displayed. Furthermore, the trip plan 102 can be shared with other users, in which case the user users can search for particular tags, e.g. "Casino", and all items shared by other users that have a matching tag, e.g. "Casino" will be presented as search results.

The items 103 may be Yahoo!® Travel destinations, such as descriptions of an attraction, restaurant or hotel lists, travel offers, other trip plans, and the like. The items 103 may further include clipped content, e.g., annotated web comments URL's, and free form content, e.g., direction to a friend's home, reservation information, reminders, observations, tips, and the like.

The trip planner 101 may include one or more components to create and edit a trip plan, such as a content collector component 126. A user may select or "Clip" Yahoo!® Travel destinations directly to a trip plan 102. A Clippings utility may save and annotate both Yahoo!® Travel destinations and destinations from sources other than Yahoo!® Travel (e.g., URL's, text, images, etc.). Additionally, free-form, i.e., user defined, destinations may be added by submitting a template or modifying an existing trip plan 102 or pre-built trip plan 102 (e.g., from another user, system, or a user's previously created trip plan).

The user may create an itinerary within a trip plan 102 by scheduling items 103 on a calendar 125. The user may further create routes, such as driving directions, within the trip plan by sequencing items 103 (two or more items 103 representing destinations, locations, etc.). The user may sort and view the trip plan according to various criteria, such as metadata attributes of the items 103. Additionally, during or after completing the trip plan, the user may add experiences and observations for the trip as additional items 103. The trip planner component may also suggest a trip plan or content for the trip plan based on user specified information or profiles (e.g., destination, length of stay, budget, indicated interests, or the like).

The trip plan 102 includes a map 130, e.g. a geographical map, which presents a graphical representation of an area corresponding to the address of one or more of the items in the set of items 103. In one example, the map 130 presents a graphical image of an area including the addresses of the first item 111, the second item 112, and the Nth item 113, and the graphical image includes an icon 131, an icon 132, and an icon 133, corresponding to the respective items and positioned on the graphical image at locations defined by the addresses of the corresponding items. The trip planner 101 can also store the trip plan 102 in a stored trip plans database 140, from which the trip plan can subsequently be retrieved.

The trip plan 102 may be flexibly designed with various levels of complexity. In some examples, the trip plan may printed for use along the actual trip, and desirably includes a customized collection of content that may replace conventional guidebooks and collections of loose paper relating to the trip. Additionally, a user may update the trip plan with actual details and experiences and share or view trip plans with other users.

The trip planner 101 may create, store, and present for display multiple trip plans. The trip plans may include various types of trips, e.g., a 3-day visit to San Francisco, Honeymoon in Paris, rock climbing tour of Utah, 5-days in New York on a shoestring budget, luxury weekend in Napa Valley. Additionally, the trip plans 101 may include recommendations or favorites, such as "Dave's favorite Vegas casinos," "Best B&B in Femdale," or the like.

Figure 1B:
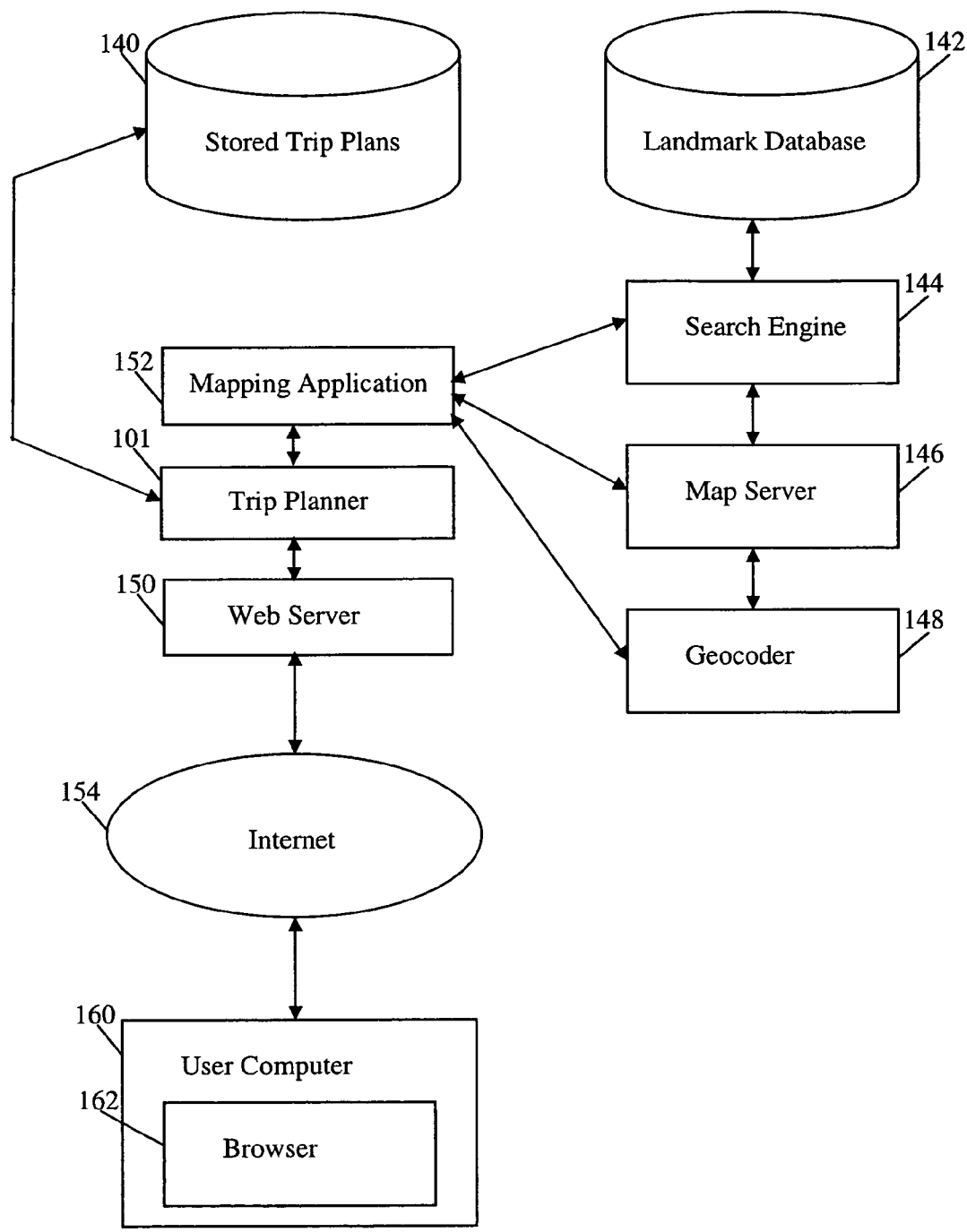
FIG. 1b is a block diagram of an exemplary system for providing a trip planner.

FIG. 1b is a block diagram of an exemplary system for providing a trip planner via the Internet. The system includes the trip planner 101 of FIG. 1a, a database 140 for storing trip plans, a mapping application 152, and a web server 150, which manages the interaction between a browser 162 and the trip planner 101.

The trip planner 101 includes computer program code to generate and transmit a trip plan to the web server 150 that receives a user's request. The trip planner 101 retrieves maps for geographic locations specified in the user's request from the mapping application 152. The mapping application 152 provides maps as described in co-pending and co-assigned U.S. patent application Ser. No. 10/849,083, entitled "MAPPING METHOD AND SYSTEM", filed May 19, 2004. The mapping application 152 uses a map server 146, a search engine 144, a landmark content database 142, and a geocoder 148 to generate maps and display trip plan items as icons on the maps, as described in U.S. patent application Ser. No. 10/849,083.

The system also includes an interface application such as a web browser 162 running on a user computer 160, or browser application used on a mobile device including but not limited to a cell phone. The browser 162 or similar application is used to interact with the trip planner 101. The browser 162 is responsible for rendering a user interface in accordance with output data, e.g. HTML and JavaScript™ received from the trip planner 101, allowing user interactions with the trip planner 101 via the user interface, and transmitting user requests to the trip planner 101. The trip planner 102 may be implemented as a series of web pages linked by Uniform Resource Locators (URL's). The web pages may be defined in HTML and JavaScript™ to provide the user interface in the web browser 162.

The trip planner may also include server-side implementation logic, which may be computer program code in a programming language such as Java™ or the like. The server-side implementation logic generates the HTML and JavaScript web pages and processes input data received from the user. The server-side logic of the trip planner is implemented using the well-known PHP Hypertext Processor. The server-side logic generates the HTML and JavaScript web pages and processes input data received from the user. Trip plans and associated information are represented as objects, e.g., TripPlan objects for storing the trip-level meta-information like title, description, start/end dates; TripPlanItem and TripPlanItemContent objects for storing item-level information like item name, category, location, notes, etc.; TripPlanSchedule objects for storing scheduling information; TripPlanDrivingDirection objects for storing driving directions; and TripPlanTag objects for storing tags. These objects are stored in the stored trip plans database 140 using the MySQL® relational database available from MySQL AB of Uppsala, Sweden.

The server components, including the trip planner 101, the mapping application 152, the database of stored trip plans 148, and the search engine 144, can be hosted locally or on remote servers, or on a single host.

Figure 2A:
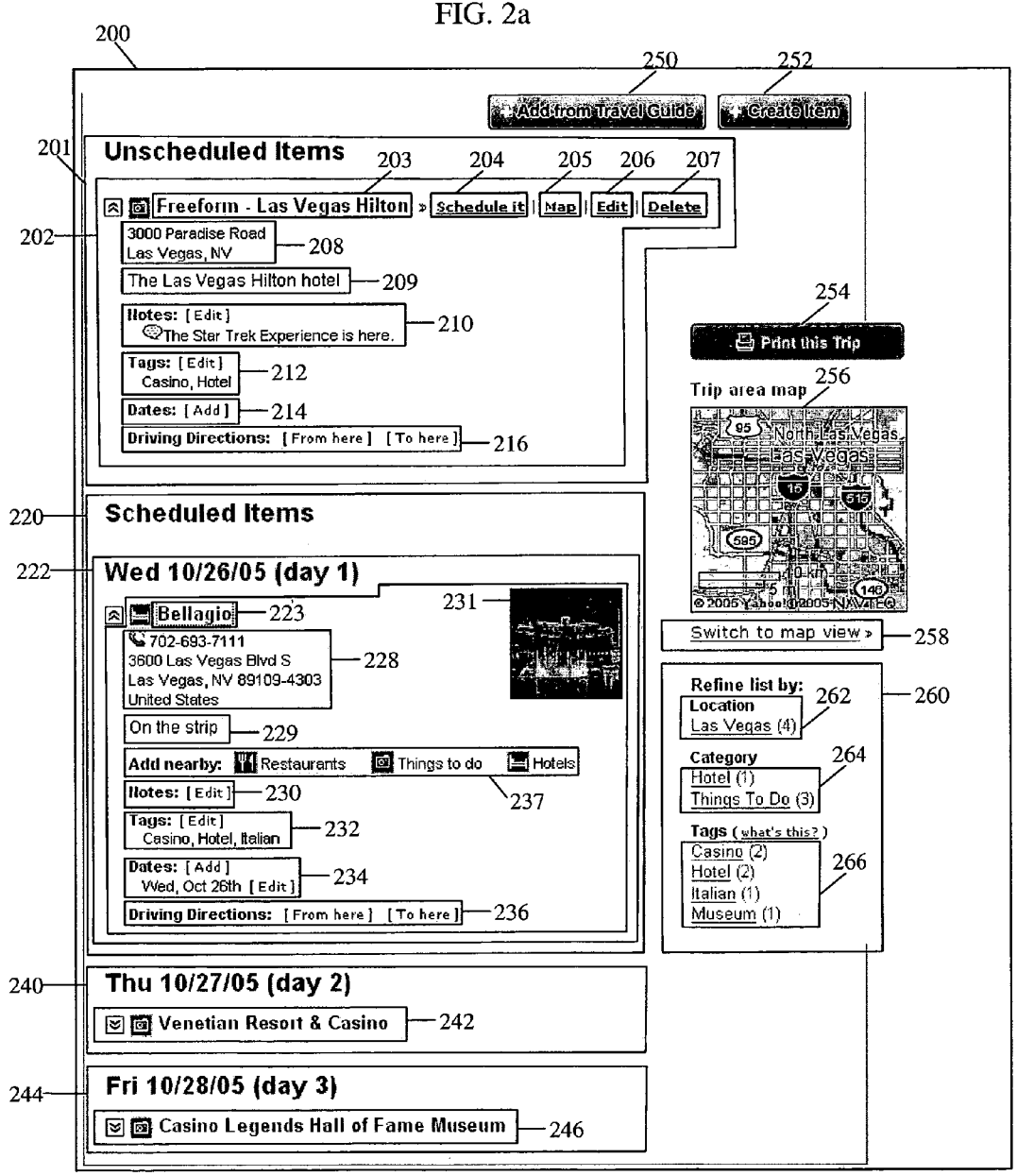
FIG. 2a illustrates an exemplary trip planner list view.

FIG. 2a illustrates an exemplary list view of a trip planner user interface. A trip planner user interface 200 includes a list of unscheduled items 201, a list of scheduled items 220, an "Add from Travel Guide" button 250, a "Create Item" button 252, a "Print New Trip" button 254, a map 256, and a refine menu 260. Together, the unscheduled items 201 and the scheduled items 220 form a trip plan. The list of unscheduled items is optional, and if present includes one or more items for which a data has not been assigned. Each unscheduled item 202 includes a name 203, an address 208, a description 209, notes 210, tags 212, dates 214, a driving directions link 216 for generating driving directions to or from the item's address 208, a "Schedule It" link 204 for assigning a date or day of the trip to the unscheduled item 202, a "Map" link 205 for causing a map view showing the item's address 208 to be displayed, an "Edit" link 206 for causing an item editor interface to be displayed. The item editor interface allows the user to change the name and metadata associated with the unscheduled item 202.

The tags 212 are described above with respect to the tags 122 of FIG. 1. The tags 212 can be added, modified, and removed by a user to assign meaning to the associated trip plan item 202. Similarly, the notes 210 can be added, modified, and removed by a user to describe the associated trip plan item 202, and the dates 214 can be set to specific dates to cause the unscheduled item 202 to be moved to the scheduled items list 220.

The list of scheduled items 220 includes three days. Each day can include any number of scheduled items. A first day 222 includes one item with a name 223 (Bellagio), an address 228, a description 229, notes 230, tags 232, dates 234, and driving directions links 236, all of which have similar meaning to the fields of the same name described above for the unscheduled item 202. The scheduled item 220 is also associated with an image 231 that visually depicts the item, a menu 237 for displaying destinations nearby the address 228 from a travel guide in particular categories (restaurants, things to do, and hotels). A second day 240 includes a trip plan item 242 (Venetian), which includes fields of the same type as the trip plan item 222 described above. A third day 244 includes a trip plan item 246. The fields of the items in the second day 240 and the third day 244 are not shown, but are similar to the fields of the item in the first day 222.

The "Add from Travel Guide" button 250 allows a user to select a destination from a travel guide. The user can add the selected destination to the trip plan as an item. The "Create Item" button 252 allows a user to create a new item by providing values for the item fields, e.g. the name, address, and description of a new item, and add the new item to the trip plan.

The "Print New Trip" button 254 allows a user to generate a printable view of a trip plan. The final trip plan may be printed out in its entirety or in two or more sections (e.g., as a .pdf format). Additionally, the trip plan may be saved locally (e.g., a user computer) or remotely (e.g., a server or online storage account). The trip plan may be emailed or linked to others, and may be synced to a remote devices, e.g., handheld device such as a mobile phone or GPS devices.

The map 256 shows the locations of trip plan items. The refine menu 260 allows a user to filter the trip plan, including the unscheduled items 201 and the scheduled items 220, to include only items with a particular location 262, or a particular category 264, or particular tags 266.

Figure 2B:
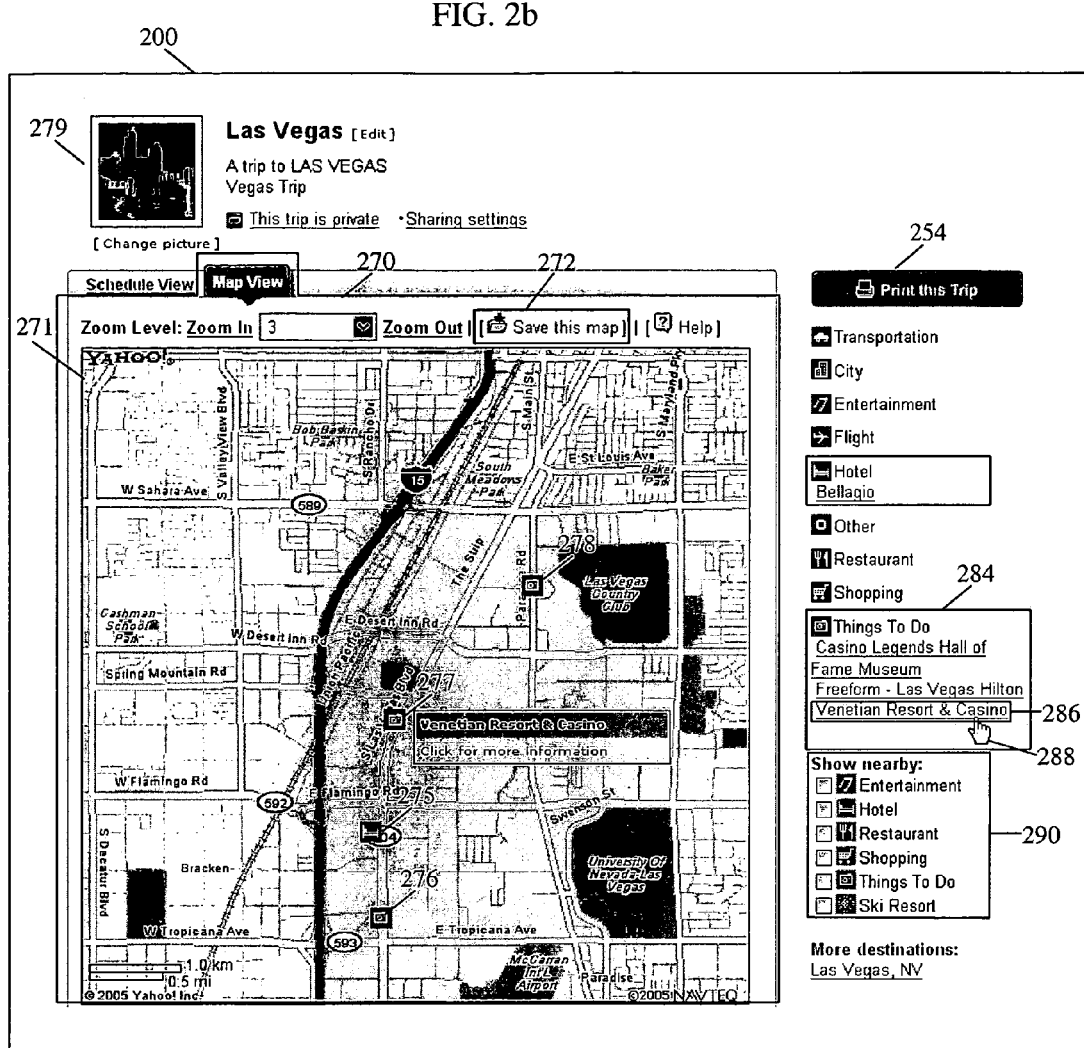
FIG. 2b illustrates an exemplary trip planner map view.

FIG. 2b illustrates an exemplary map view of a trip planner user interface. A trip plan 200 includes an associated icon 279 to illustrate the trip, a map view 270, a Print this Trip button 254, a Things To Do list 284, and a Show nearby list 290. The map view 270 includes a map 271 and a Save this map button 272. The map 271 shows the locations of trip plan items, such as a Bellagio item location 275, a Casino Legends item location 276, a Venetian item location 277, and a Las Vegas Hilton item location 278. These item locations correspond to the trip plan items Bellagio 223, Casino Legends 246, Venetian 242, and Las Vegas Hilton 202, respectively, and are positioned on the map view 271 using the addresses associated with the respective trip plan items. The Print this Trip button 254 can be selected or pressed by a user to generate a print view of the trip plan. The Save this map button 272 causes the map 271 to be saved as an item in the trip plan 200. The item created by saving the map 271 will appear as an item in the Unscheduled Items list 201 of the trip plan, as shown in FIG. 2a. The Save this map button 272 is an example of map item selection logic for adding a travel guide item to the trip plan.

The Things To Do list 284 displays a list of items from the trip plan 200 that are located in the geographical area shown in the map 271. For example, the Things To Do List 284 includes a Venetian link 286, which corresponds to the Venetian trip plan item 242 of FIG. 2a. A mouse pointer 288 is positioned over the Venetian link 286, and as a result a detailed description of the Venetian item 277 is shown on the map. The Things To Do list 284 is an example of map detail logic for adding details concerning trip plan item to the map view 271. The Show nearby list 290 shows a list of travel guide categories 290. The user can select a category from this list, e.g. Entertainment, to cause destinations in the selected category that are in the area covered by the map view 271 to be shown in the map view 271.

Figure 3:
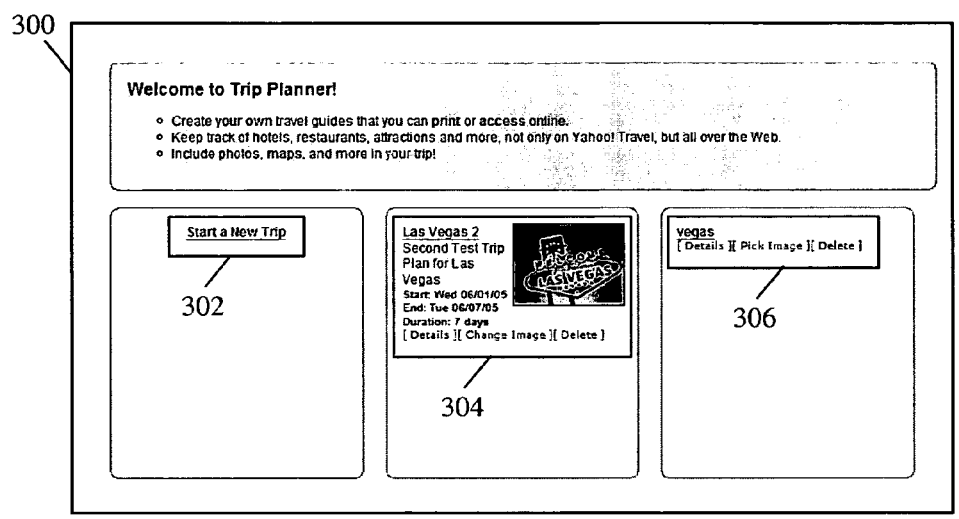
FIG. 3 illustrates an exemplary trip plan index user interface.

FIG. 3 illustrates an exemplary trip plan index user interface for creating new trip plans and opening existing trip plans. As stated, the example is illustrated with Yahoo!® Travel for illustrative purposes only. In this example, the user interface for creating and is presented with the trip planner 300 in a browser application, but the user interface is not so limited. As shown in FIG. 1, a user may create a trip plan (sometimes referred to herein as a travel guide), which may be printed or stored and accessed online. Further, the trip plan may include photos, maps, and the like. Further, the user is presented with a Start a New Trip link 302, and links to review or edit an existing trip named "Las Vegas 2" 304, and to review or edit another existing trip named "vegas" 306. Selection of the Start a New Trip link 302 causes an interface for creating a new trip plan to be displayed, as described below. Selection of one of these existing trips causes a trip planner user interface such as the list view shown in FIG. 2a to be displayed.

Figure 4:
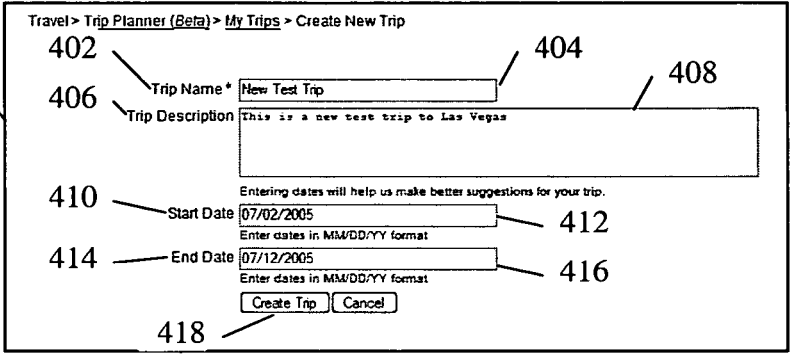
FIG. 4 illustrates an exemplary user interface for creating a new trip plan.

FIG. 4 illustrates an exemplary user interface for creating a new trip plan. A new trip plan user interface 400 includes input fields in which a user can provide expected dates of the trip as a start date 410 and an end date 414. A user may also input a trip name 402, a short description 408 of the trip. The user may select or press a Create Trip button 418 to create a trip.

Figure 5:
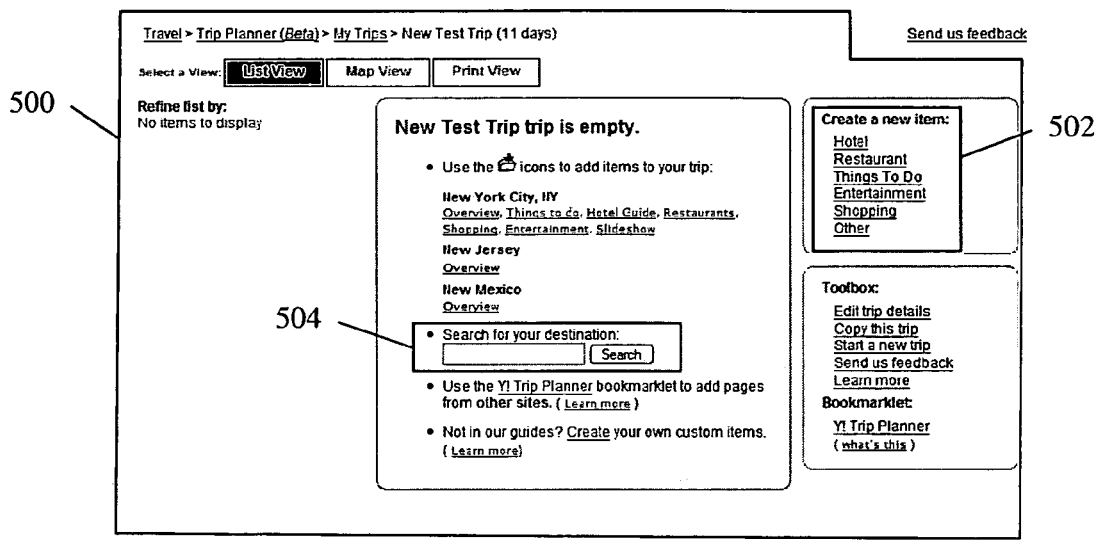
FIG. 5 illustrates an exemplary trip list view prior to adding any items to the trip.

FIG. 5 illustrates an exemplary trip list view prior to adding any items to the trip. To create a new trip, a user may select an item from a travel guide. An empty trip list view 500 includes a destination search field 504 in which a user can enter a search query, e.g. a keyword such as "Vegas". In response, a list of destinations containing the keyword will be displayed, and the user will be able to add specific destinations from the list to the trip plan. Alternatively, the user can select a destination category from a category list 502, which includes categories such as Hotel and Restaurant. In response to selection of a category, a list of destinations in the selected category will be displayed, and the user will be able to add specific destinations from the list to the trip plan.

FIG. 6 illustrates an exemplary process by which a user may add a new item to a trip plan. The user may create a new trip plan item by filling in various fields regarding the item in the new item interface 600. The new item interface 600 includes fields in which the user can identify a trip 602 the item is to be added to, a category 606 for the item, a name 610 for the trip, a web site URL 614 for the item, a description 618 of the item, a phone number 622 for the item, an address 626, a city 630, a state 634, and a zip code 638, which specify a location of the item. The location will be used by the trip planner to show the items location on a map. An Add Item button 650 can be selected or pressed to cause a new item to be added to the trip plan with the values specified in the fields. In other examples, additional or fewer fields and descriptors may be used for adding an item.

Figure 7:
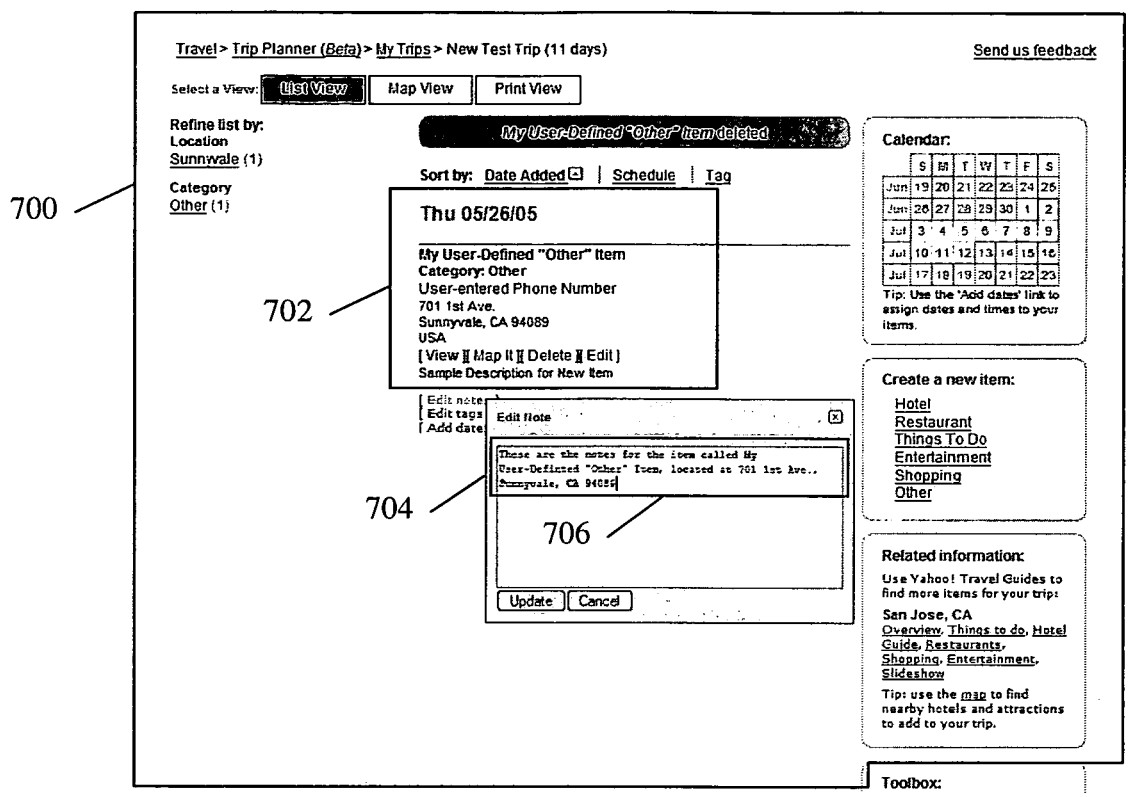
FIG. 7 illustrates an exemplary process for adding notes to an item

FIG. 7 illustrates an exemplary process for adding notes to an item. Notes are a form of metadata. A trip plan list user interface 700 displays a trip plan item 702, which includes an Edit Notes link (not shown). When a user selects or clicks on the Edit Notes link, an Edit Note interface 704 is displayed, in which a user may add various notes, comments, etc. which will be associated with the item. A note 706 includes text entered by the user. The notes may be accessed at a later time and may be searched by the user and/or the system (e.g., to generate recommendations/promotions).

Figure 8:
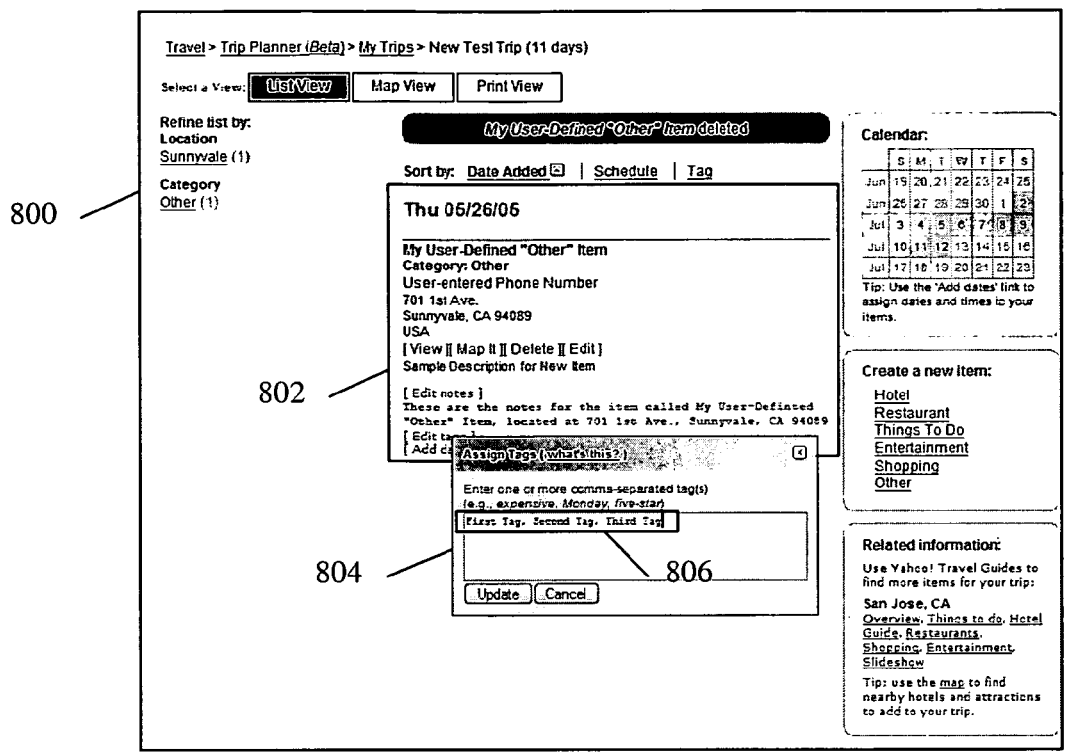
FIG. 8 illustrates an exemplary process for adding tags to an item.

FIG. 8 illustrates an exemplary process for adding tags to an item. Tags are a form of metadata. A tag editor 804 appears when a user selects an Edit Tags link in a trip planner 800. The tag editor 804 allows a user to enter and modify tags 806. Tags 806 may include one or more comma separated tags associated with the item. Exemplary tags might include "expensive," "five-star," or the like. The tags 806 include three tags: "First Tag", "Second Tag", and "Third Tag". Once added, the tags may be included and viewable by the user within the user interface (see, e.g., tags 212 of FIG. 2a, which includes two tags, "Casino" and "Hotel"). The tags may be accessed at a later time and may be searched by the user and/or the system (e.g., to generate recommendations or promotions), or by other users, e.g. to locate trip plans that match a user's interests. For example, a user can search for the tag "Casino", and all trip plan items with the tag "Casino", such as the item 202 of FIG. 2a, will be provided to the user as search results.

Figure 9:
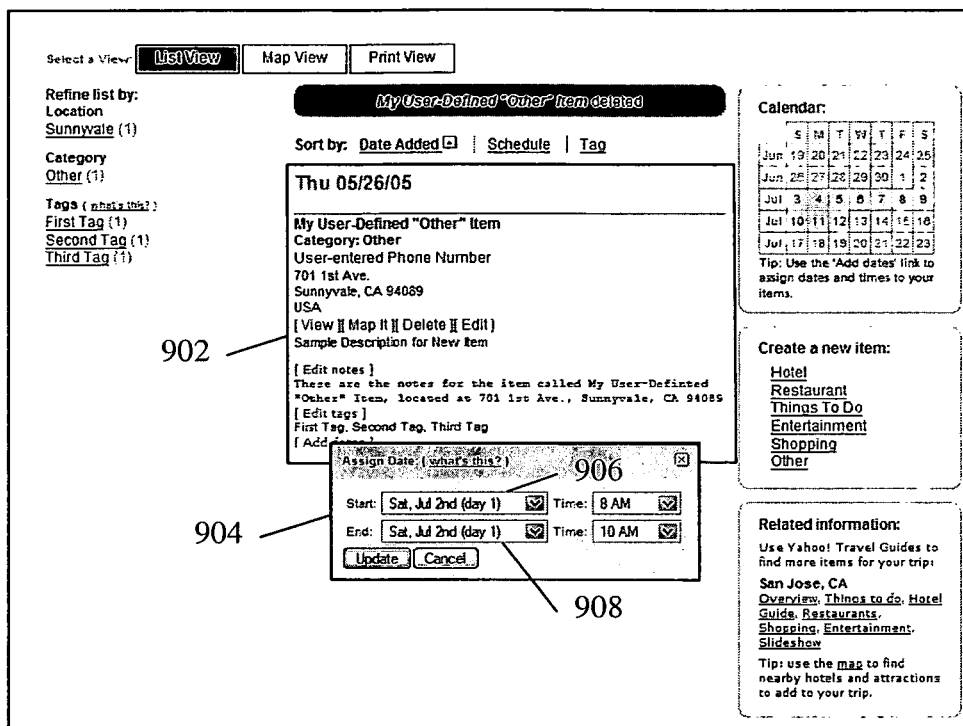
FIG. 9 illustrates an exemplary process for adding dates to an item, note tags added on the left.

FIG. 9 illustrates an exemplary process for adding dates to an item 902. Dates may be inserted by the user by selecting a start date 906 and an end date 908 from an Assign Date interface 904. Additionally, dates may be associated with the item by selecting or by drop and drag features with the calendar shown in FIG. 9.

Figure 10:
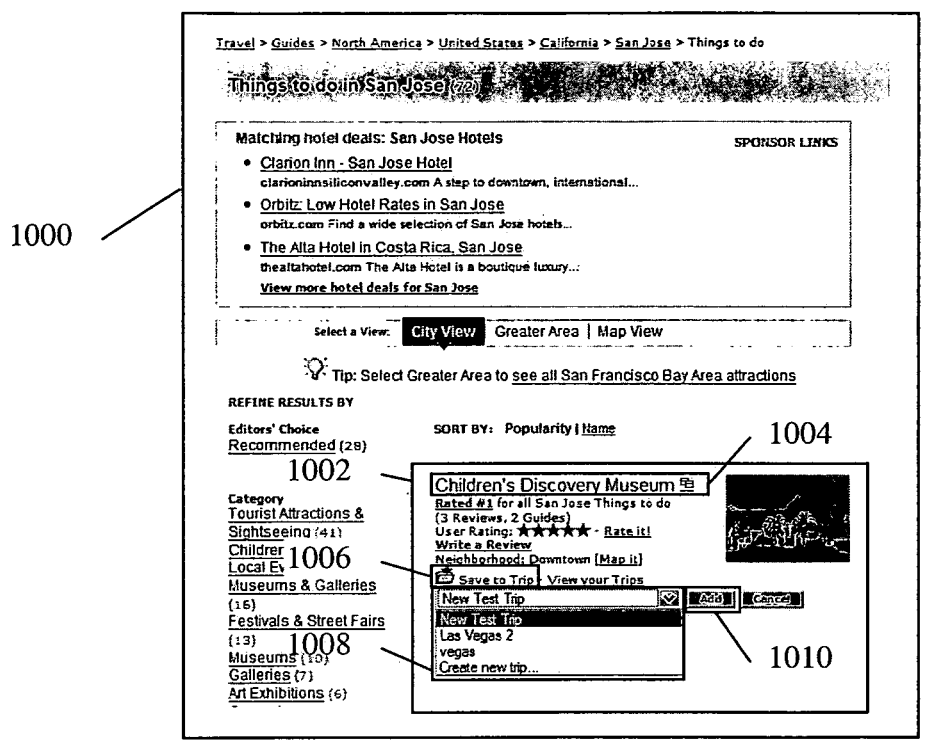
FIG. 10 illustrates an exemplary process for saving a destination from a travel guide to a trip plan.

FIG. 10 illustrates an exemplary process for saving a destination from a travel guide to a trip plan. A travel guide 1000 includes a listing of destinations. A destination 1002 includes a name 1004, and a Save to Trip link 1006. When a user selects the Save to Trip link 1006, a menu of trips 1008 appears, from which the user can select a trip. As shown, the user has selected "New Test Trip". An Add button 1010 can be selected or pressed by the user to add the destination 1004 to the selected trip, e.g. "New Test Trip". The destination 1004 will then appear as an unscheduled item in the trip plan of FIG. 2a.

Figure 11:
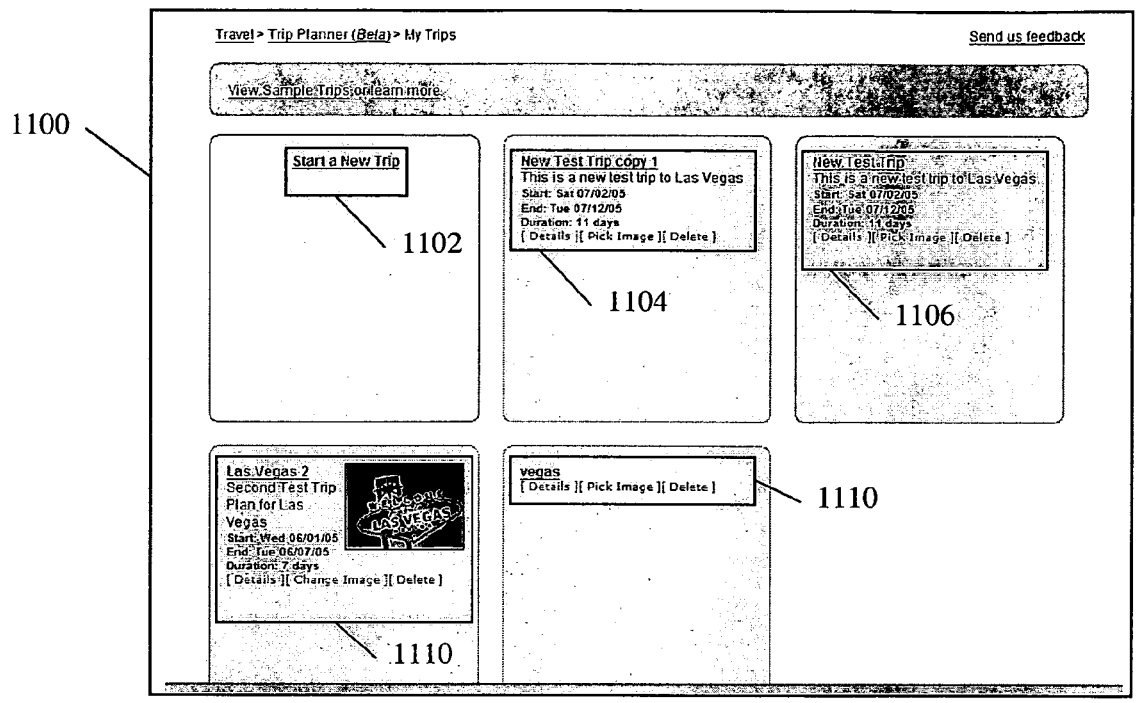
FIG. 11 illustrates an exemplary trip plan index similar to that of FIG. 3.

FIG. 11 illustrates an exemplary trip plan index similar to that of FIG. 3. A trip plan index 1100 includes a link to Start a New Trip 1102, and links to select existing trips, such as a "New Test Trip" link 1106. The trip plan index 1100 also shows a copied trip "New Test Trip copy 1" 1104, which has been copied from the trip "New Test Trip" 1106. A Copy Trip link (not shown) allows a user to make a copy of an existing trip.

Figure 12:
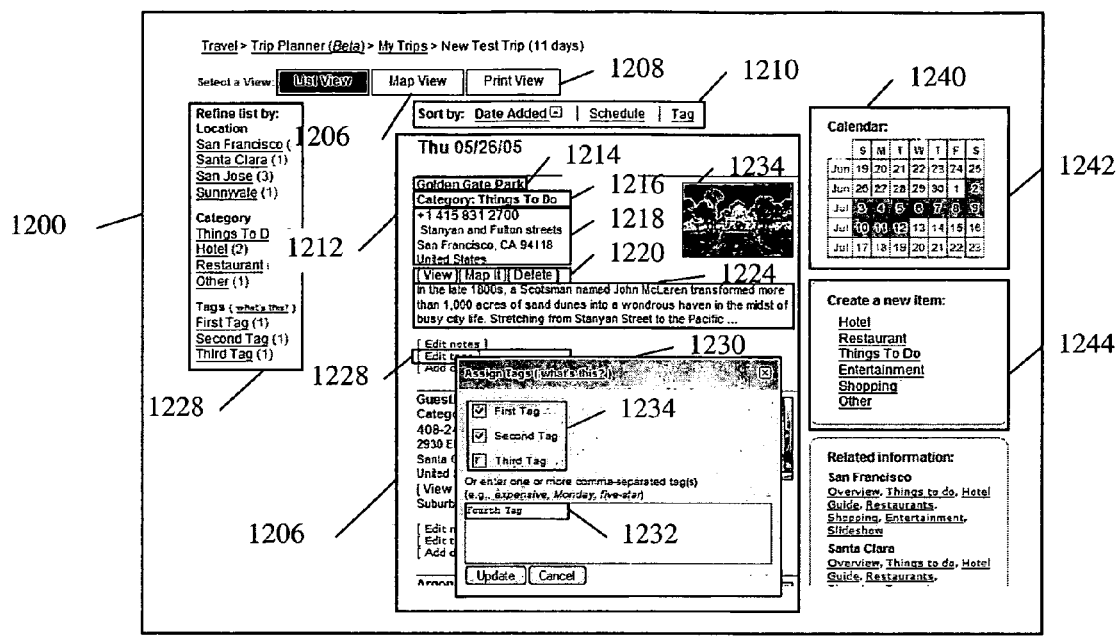
FIG. 12 illustrates an exemplary process where tag suggestions are provided based on previously-used tags.

FIG. 12 illustrates an exemplary process where one or more Tag suggestions are provided to a user for association with an item based on previously-used tags. A trip planner 1200 includes a trip plan 1212 with multiple trip plan items. The first trip plan item, Golden Gate Park 1214, includes an Edit Tags link 1228. The user has selected the Edit Tags link 1228, thereby causing an Assign Tags interface 1230 to be displayed. The Assign Tags interface 1230 provides a list of suggested tags 1234, which is based on tags that have been previously used. In this case, the tags "First Tag", "Second Tag", and "Third Tag" have been used recently, and are therefore displayed in the list 1234. The user can also enter new tags, e.g., "Fourth Tag" 1232. In typical scenarios, the tags would have a meaning based on the trip plan item, e.g. a tag named "Park" would be assigned to Golden Gate Park.

Figure 13:
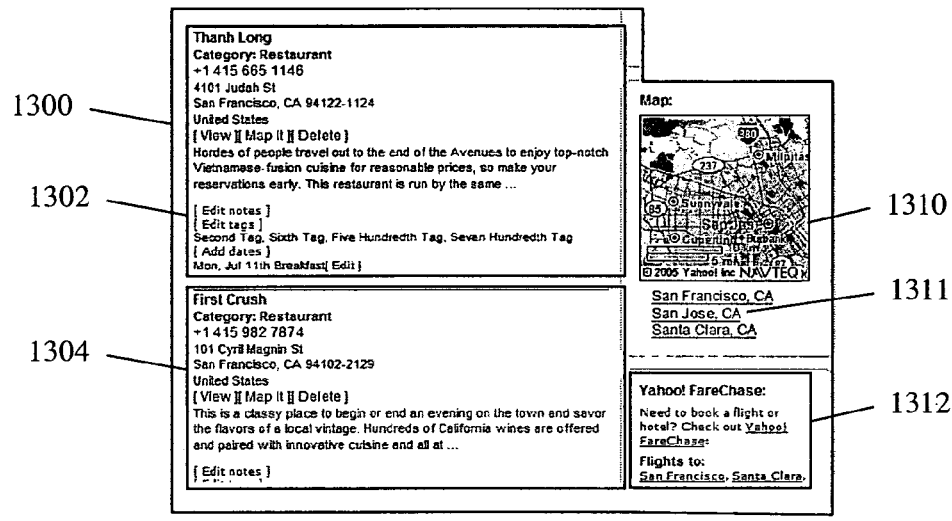
FIG. 13 illustrates an exemplary process of refining by items and displaying promotions.

FIG. 13 illustrates an exemplary process of refining by items with "Second Tag". A trip plan view 1300 is shown, with a Thanh Long item 1302 and a First Crush item 1304. A user has selected "Second Tag", which results in refining, i.e., filtering of, the trip plan view so that the view only includes trip plan items associated with "Second Tag". FIG. 13 also illustrates display of promotional items based upon the trip plan. In particular, promotions 1312, i.e., flights to San Francisco and Santa Clara, i.e., have been provided based on inputted information (moving the mouse pointer over "San Jose" 1311). Furthermore, moving the mouse pointer (not shown) over the text "San Jose" 1311, which is a city associated with the trip plan items, results in a map of San Jose appearing within the map display 1310.

Figure 14:
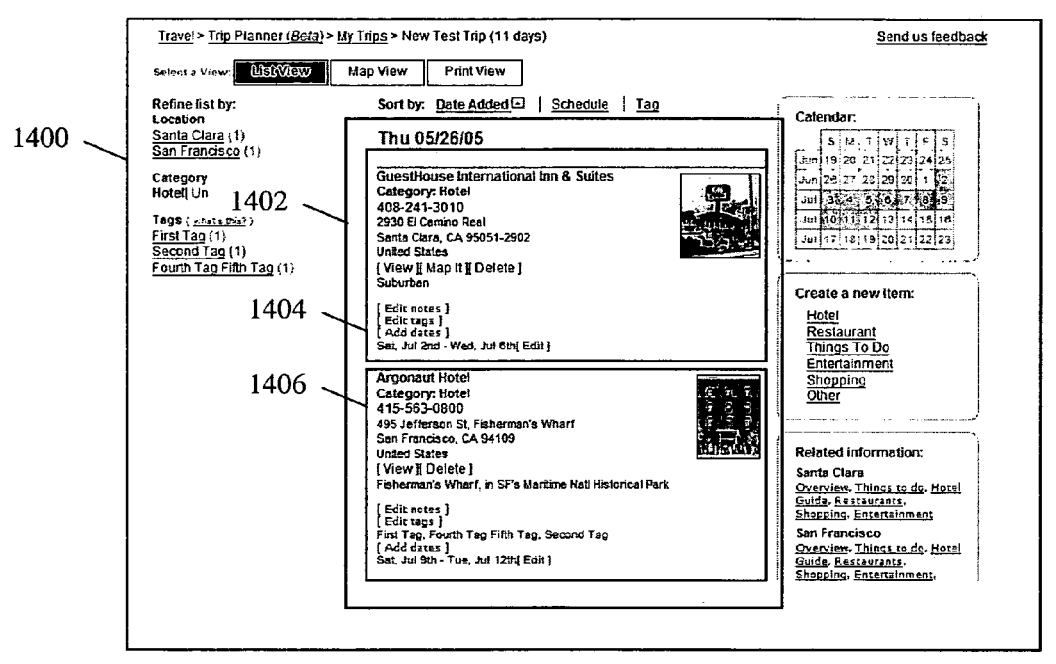

FIG. 14 illustrates an exemplary process of refining by a category. In this example, a trip plan list of a trip planner 1400 has been refined by a Hotels category to produce a refined trip plan view 1402 which includes only hotels. In particular, the trip plan view 1402 includes a first hotel 1402 and a second hotel 1406 In yet other examples, the items may be refined by location (e.g., Santa Clara or San Francisco), or the like. When items are refined by an attribute such as tag, category, or location, only items having a specified value of that attribute, e.g. a tag equal to "First Tag", are shown in the refined view.

Figure 15:
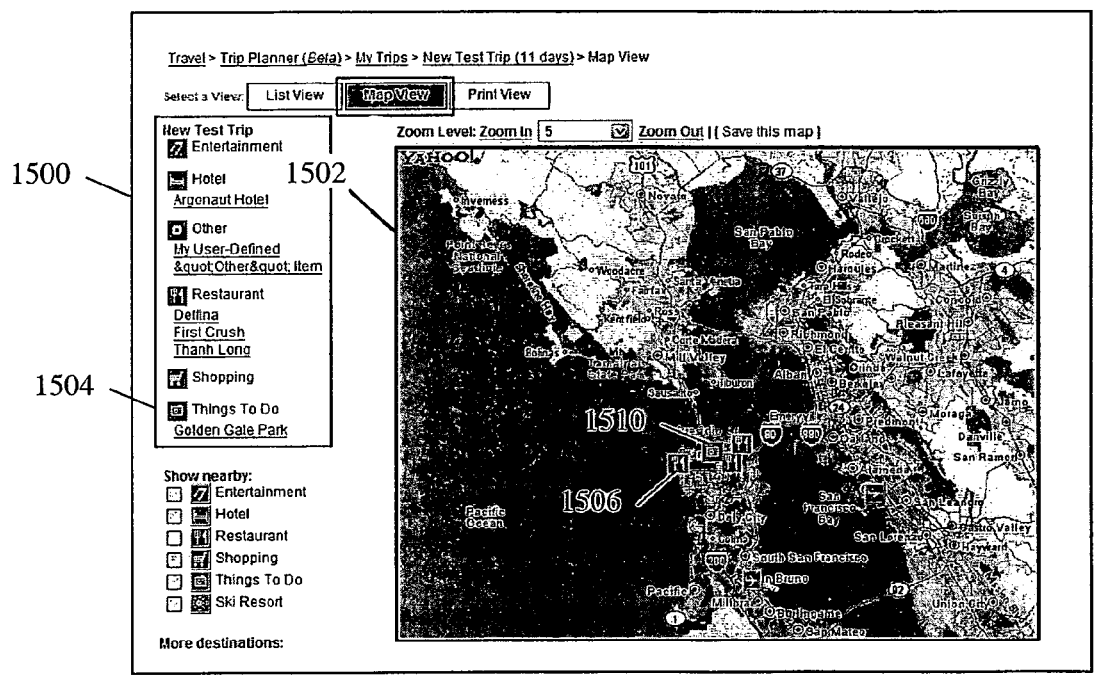
FIG. 15 illustrates an exemplary map view of the trip planner.

FIG. 15 illustrates an exemplary map view of the trip planner, where the map may include icons or other identifiers associated with locations on the map of interest. A trip planner 1500 includes a map 1502 and a categorized list of trip plan items 1504. The map 1502 displays the locations of items in the list 1504 as icons, such as an icon 1506. In one example, items saved to the trip may be separately identified, e.g., by color, size, shading, or the like from other items, such as recommended or promotional items, and items related to a category selected by the user (e.g., to show nearby hotels, airline flights to or from the items location, other advertisements related to the item's name or location, or the like).

Figure 16:
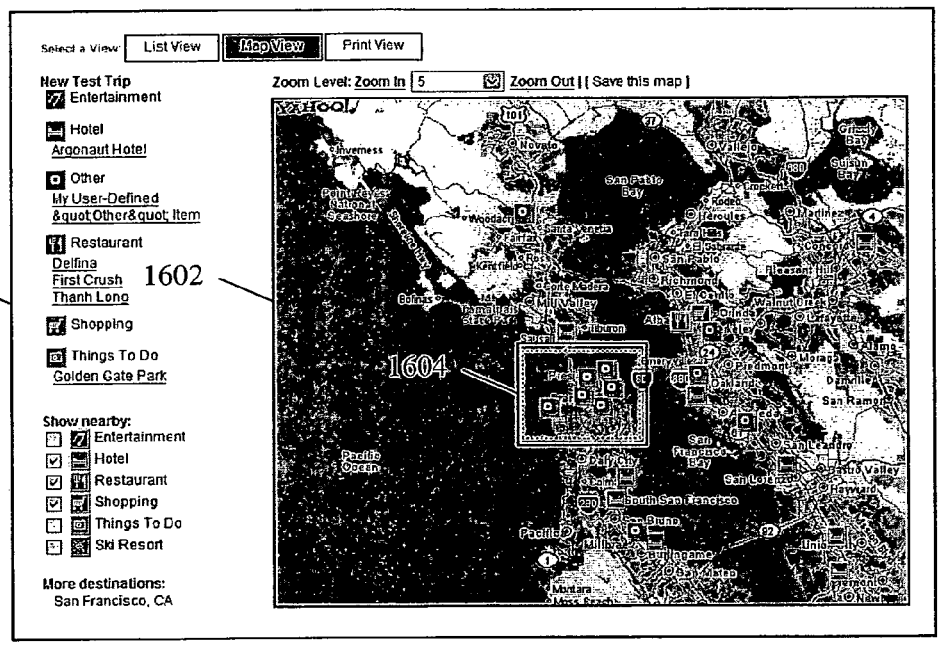
FIG. 16 illustrates an exemplary map view of the trip planner showing locations layered thereon.

FIG. 16 illustrates the map view of FIG. 15, including Hotel/Restaurants/Shopping locations layered on a map 1602. Additionally, the interface is operable to allow a user to select a portion of the map to zoom or enlarge. For example, by using cursors or a mouse, a user can drag a rectangular selection to outline an area 1604 to zoom or enlarge.

Figure 17:
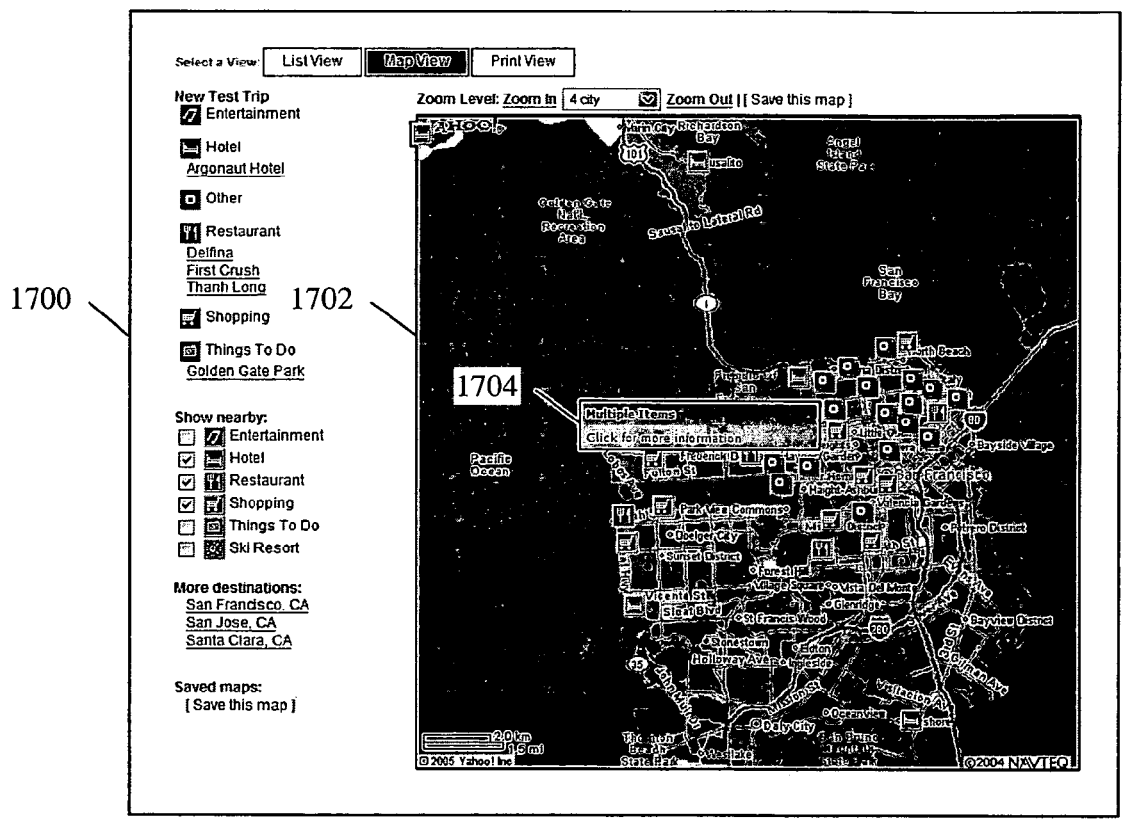
FIG. 17 illustrates an exemplary enlargement of a selected portion.

FIG. 17 illustrates an exemplary enlargement of the selected area 1604 of the map 1602 of FIG. 16. The area 1604 is displayed in greater detail as a map 1702. Moving a mouse pointer (not shown) over an icon on the map 1702 causes an item display overlay 1704 to be displayed. The item display overlay 1704 describes the selected icon. In this case, there are multiple items at the selected icon, so the item display indicates "Multiple Items" and directs the user to click to see the details of the items. In general, some items my be co-located or displayed too closely to each other to distinguish, i.e., within a region of less than a defined area in squared units of distance, in which case a varying color, shading, size, icon, or other scheme may be used to denote multiple items at that location.

Figure 18:
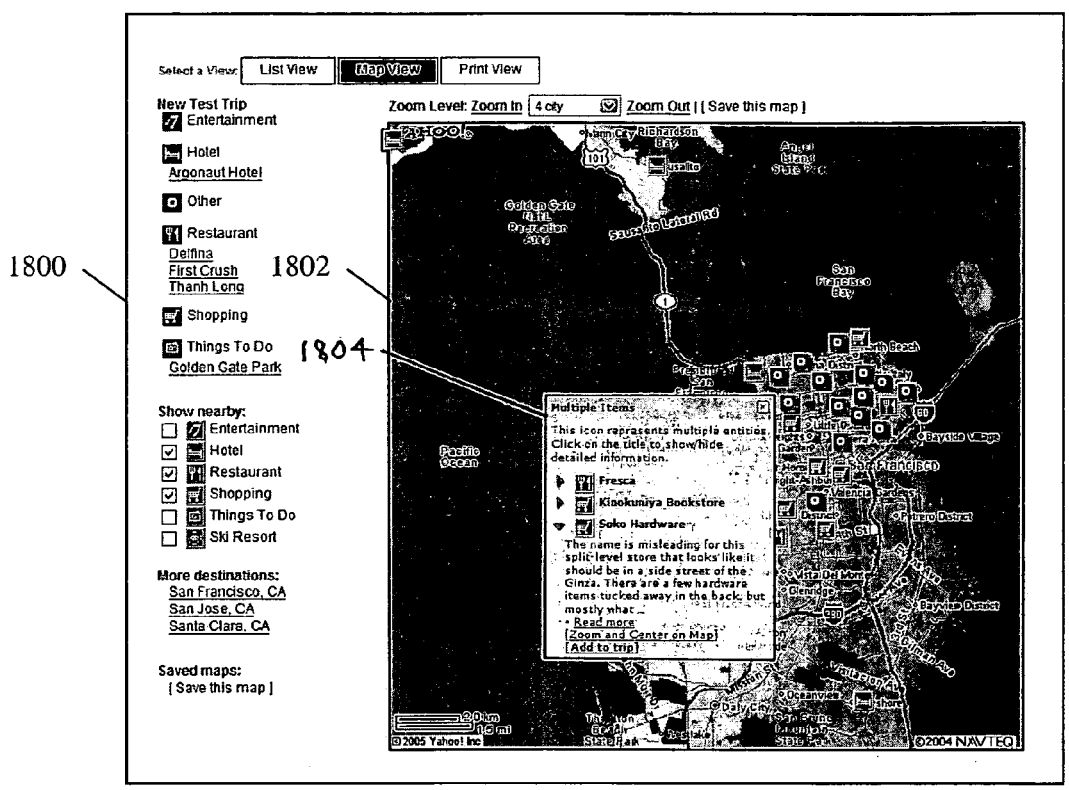
FIG. 18 illustrates an example where a location includes multiple items within the map.

FIG. 18 illustrates an example where a location includes multiple items within the map. A map 1802 includes an expanded Multiple Items display overlay 1804. An icon appears at the location of a trip plan item on the map 1802. Selecting the icon results in the Multiple Items overlay 1804, where each individual item is displayed and may be separately viewed and/or added to the trip. According to one aspect, the Multiple Items overlay 1804 has been expanded from the Multiple Items display 1704 shown in FIG. 17.

Figure 19:
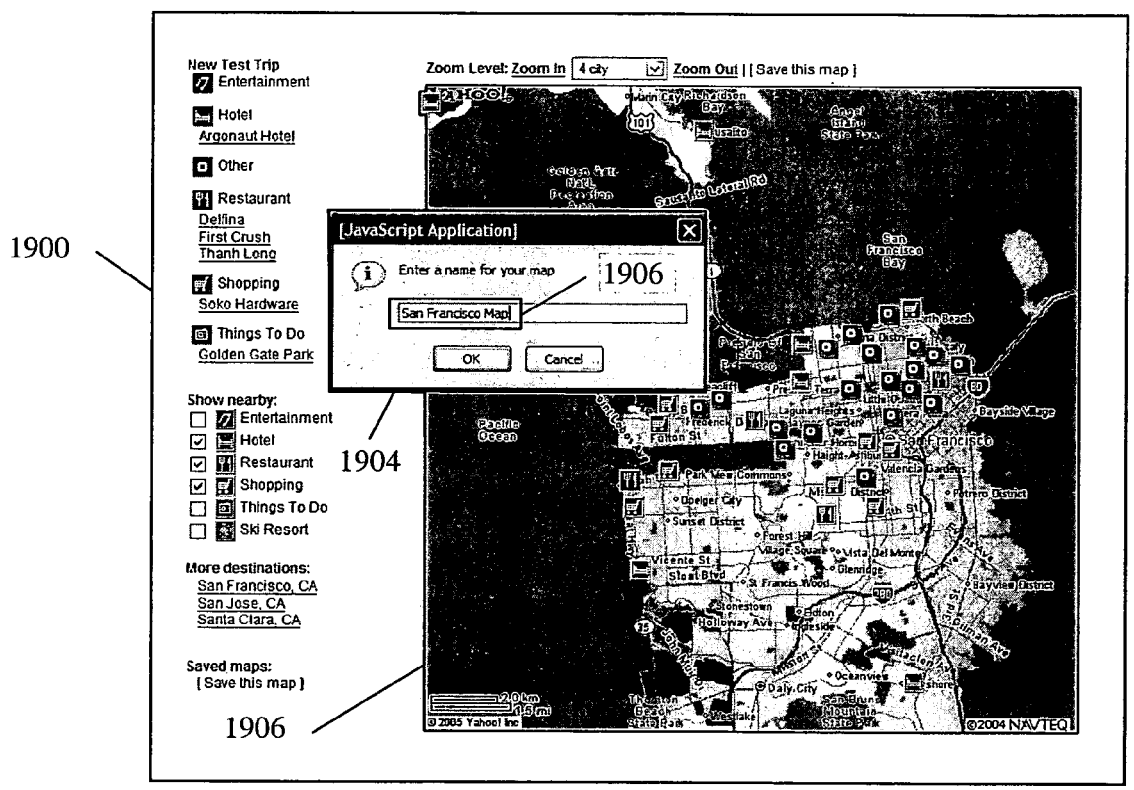
FIG. 19 illustrates an example where a user selects to save the map to the trip plan.

FIG. 19 illustrates an example where a user selects to save the map to the trip, e.g., by selecting the "Save this map" option in the lower corner of the interface. The user may then be prompted by a dialog box 1904 to add a name 1906 or title for the map. The map 1906 may then be stored to the trip as an item.

FIG. 20 illustrates an exemplary trip plan including a saved map as an item. The "San Francisco Map" 2004 is now listed as an item in the trip plan list 2002 along with other collected and saved items. The map item 2004 includes a map description and location 2008, a map image 2006, and links 2010 for editing notes and tags associated with the map. In this fashion, a user may collect items from various sources, including maps, websites, for saving with a travel plan.

Figure 21:
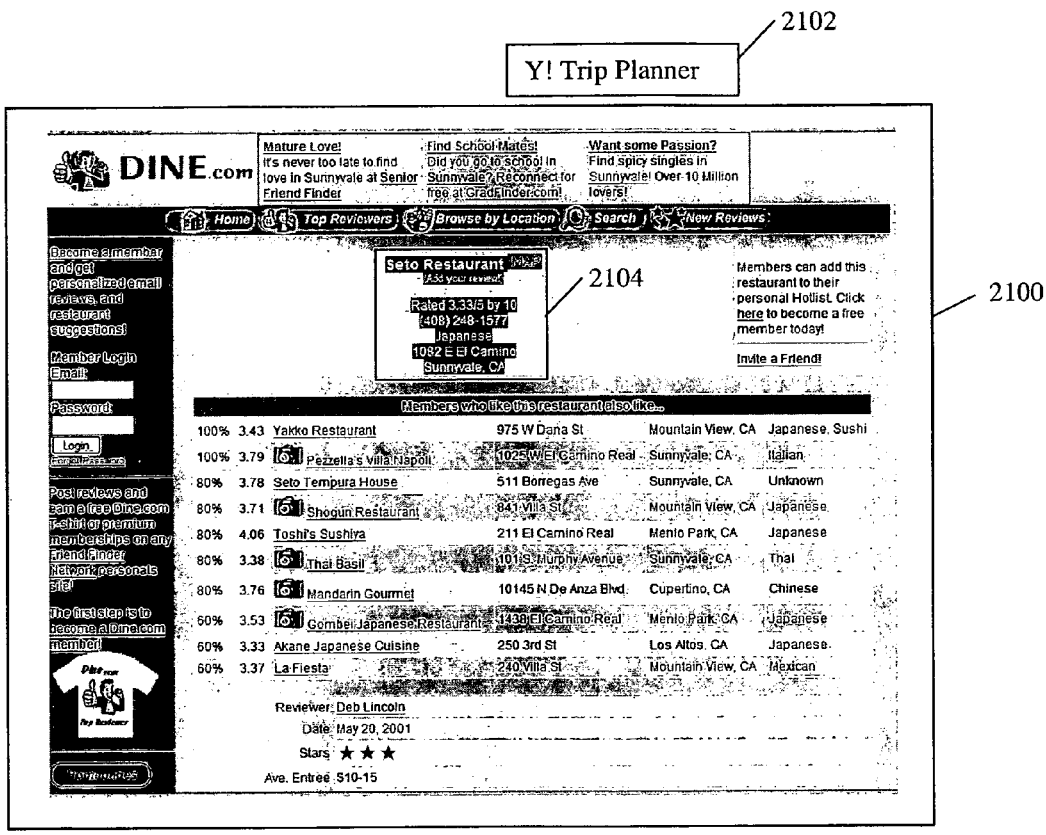
FIG. 21 illustrates an exemplary 3rd party page from which a trip plan item is being clipped.

FIG. 21 illustrates an exemplary 3rd party page that includes highlighted text from which a trip plan item is being clipped. A web browser user interface 2100 includes a "Y! Trip Planner" link or toolbar item 2102 for converting selected text such as text 2104 to a trip plan item is provided in a toolbar of a web browser by a Bookmarklet (not shown). The Bookmarklet is installed in the web browser when a user selects a corresponding installation option (not shown) from the List View.

Figure 22:
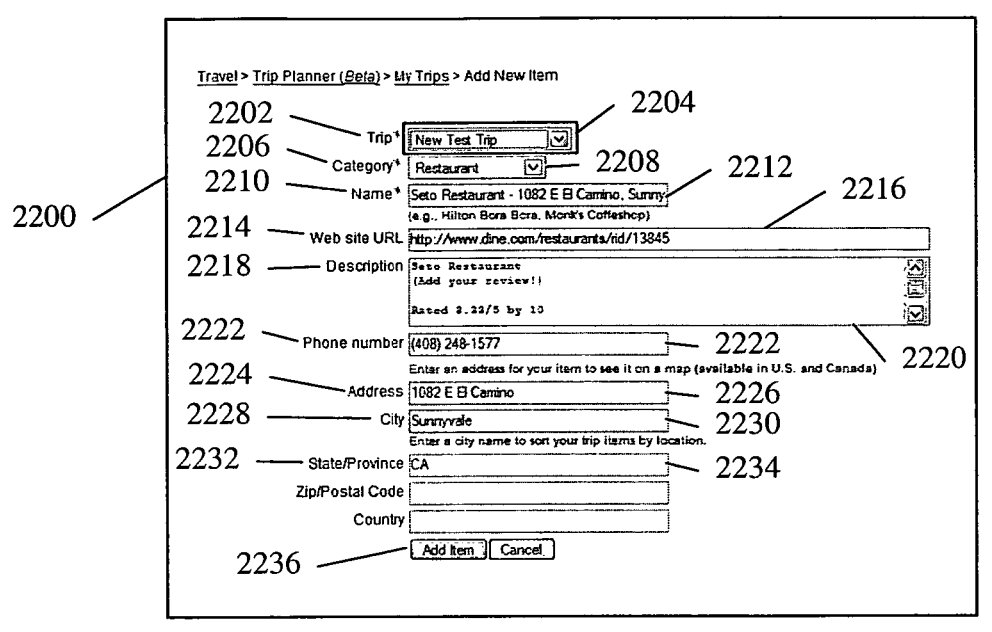

FIG. 22 illustrates an exemplary result of clicking on the trip planner (e.g., "Y! Trip Planner" 2102 of FIG. 21) link in a toolbar. As a result of clicking the link 2102, a Bookmarklet converts the selected text 2104 into trip plan item field values 2200 of an Add New Item interface 2200 by clipping the text into the description. The clipping process includes parsing the phone number and address if present. The user can modify the clipped information, e.g. by selecting different values for a category 2206 from a drop down menu 2208. A user can cause a new item to be added with the clipped information by selecting or pressing an Add Item button 2236.

Figure 23:
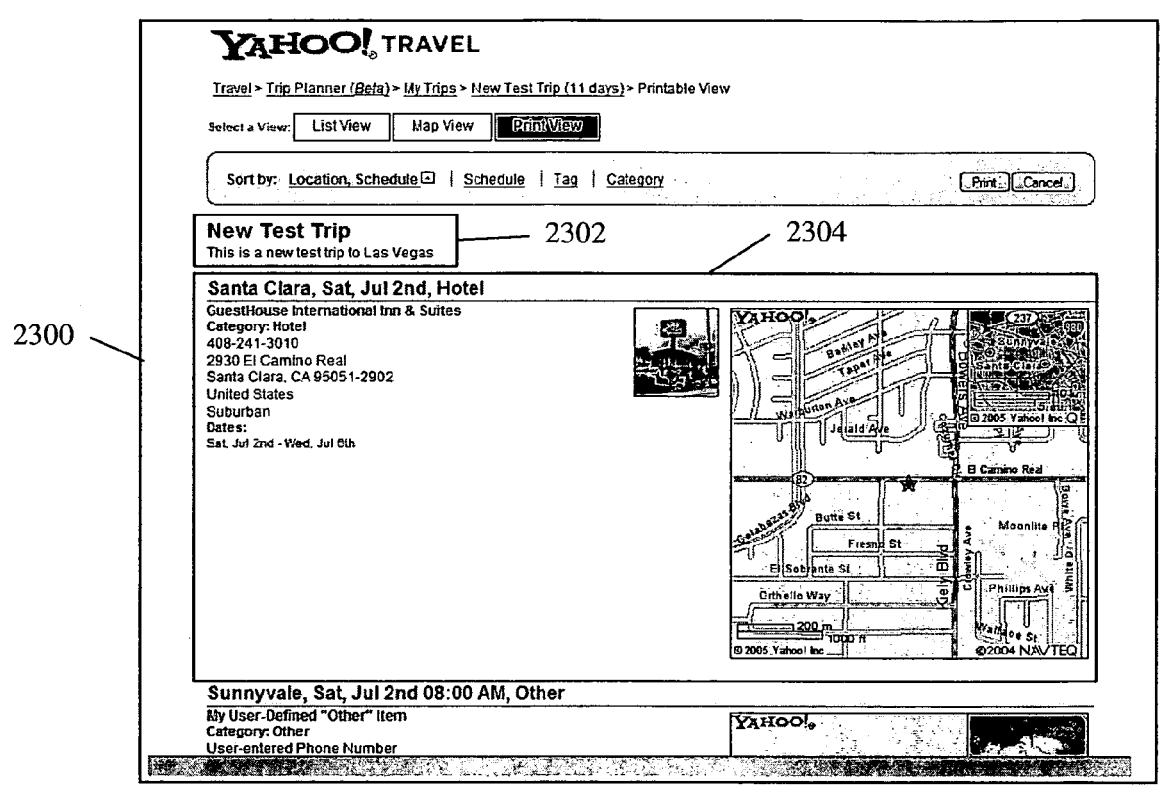

FIG. 23 illustrates an exemplary schedule portion of a print view screen for printing a trip plan. The print view 2300 is generated when a user selects the Print this Trip button 254 of the trip planner, which is shown in FIG. 2b. The print view 2300 includes a trip name 2302 and trip plan items such as a hotel item 2304. Note that the maps may include a print-view zoomed-in main map and a zoomed-out smaller map.

Figure 24:
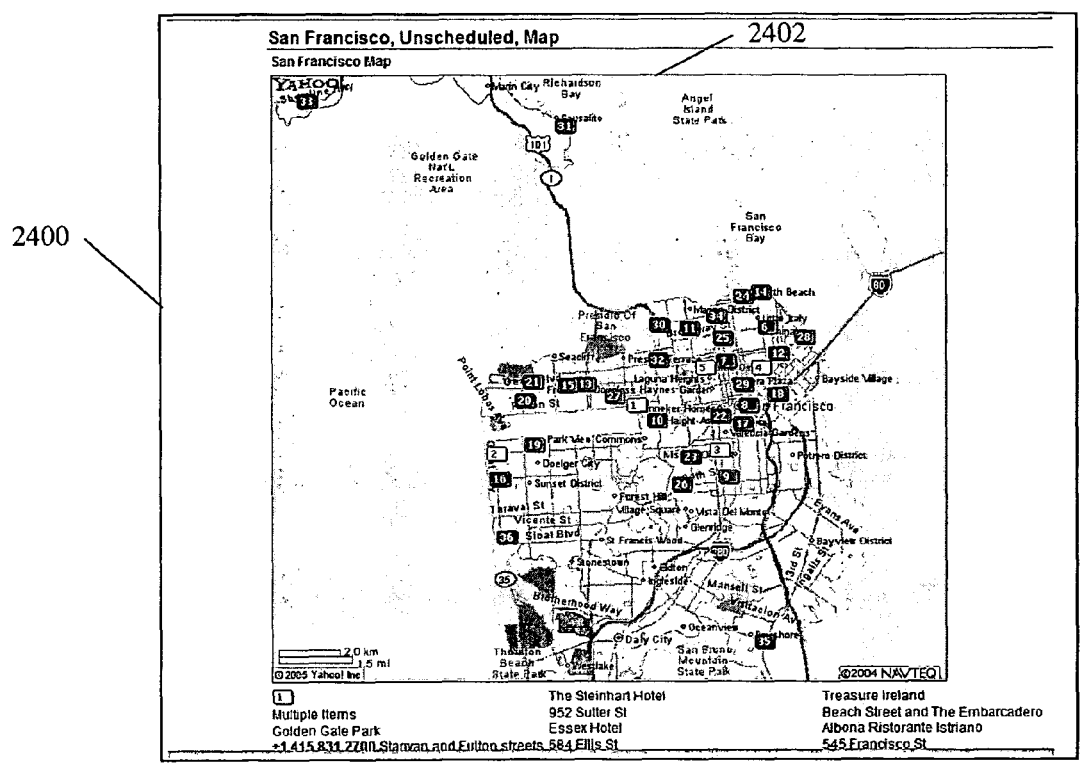
FIG. 24 illustrates an exemplary map portion of a print view screen.

FIG. 24 illustrates an exemplary map portion of the print view 2300 of FIG. 23. FIG. 24 shows a display 2400 which has been scrolled down to show the map item 2402 that was previously saved. The map view 2502 includes non-interactive points, printable points, and a listing of points. Other embodiments might include other personalized groupings of data such as local or yellow page information, real estate data, job listings, personals listings, or listings of friends.

Figure 25:
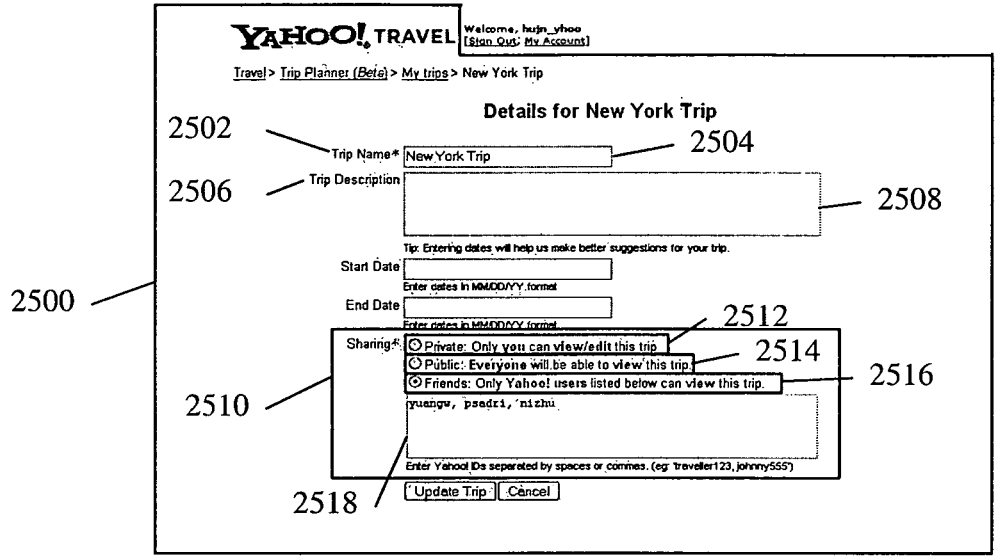
FIG. 25 illustrates an exemplary aspect whereby a user has the ability to share the trip.

FIG. 25 illustrates an exemplary aspect whereby a user has the ability to share the trip, including trip details, with the public, with friends (e.g., selected groups or subgroups), or to keep the trip private. A trip plan details user interface 2500 for controlling sharing settings of a trip plan is displayed when a user selects a "Sharing settings" or similar link in the trip planner. A "Sharing Settings" link is shown in FIG. 2b. A user can select a Private setting 2512 to prevent other users from accessing the trip plan, or a Public Everyone link 2514 to allow all users to access the trip plan, or a Private Yahoo! users link 2516 to allow a set of specified users to access the trip plan. In the latter case, the set of specified users can be entered in the text box 2518.

Figure 26:
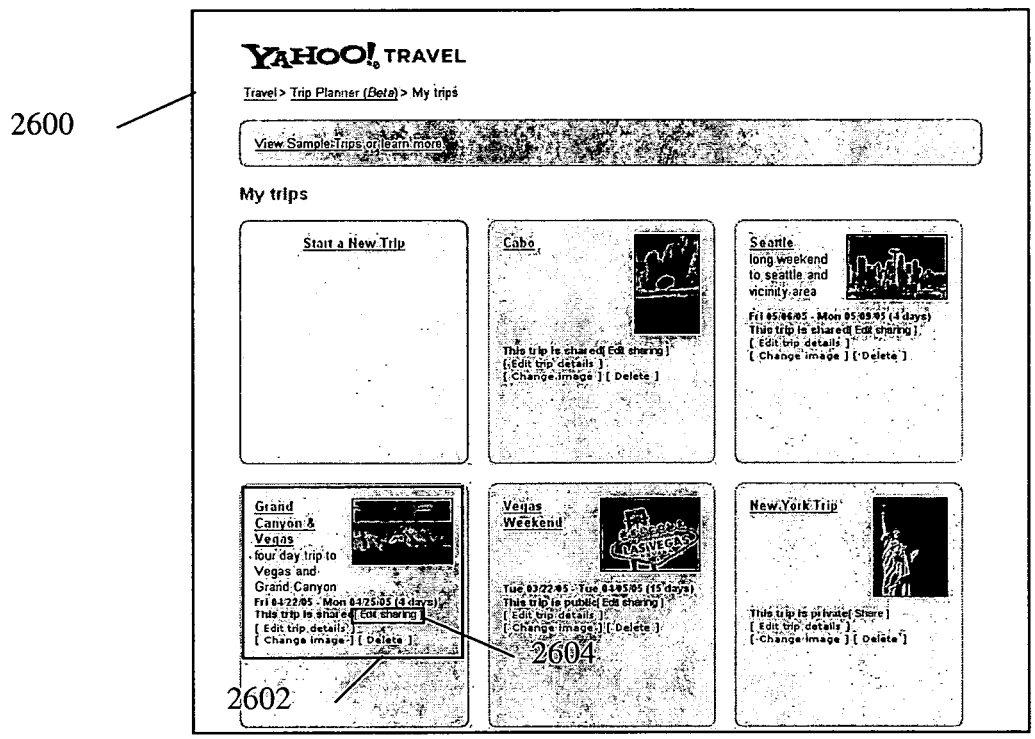
FIG. 26 illustrates an exemplary aspect whereby a user has the ability to modify the sharing status of their trips.

FIG. 26 illustrates an exemplary aspect whereby a user has the ability to modify the sharing status of their trips from a trip plan index 2600. For example, a trip 2602 includes an indicator regarding the status of the trip details, e.g., "This trip is shared" or "This trip is private." The user may select an "Edit sharing" option 2604 to display the details interface 2500 of FIG. 25. The user can modify the sharing options over time (as well as edit trip details, change the image, etc.).

Figure 27:
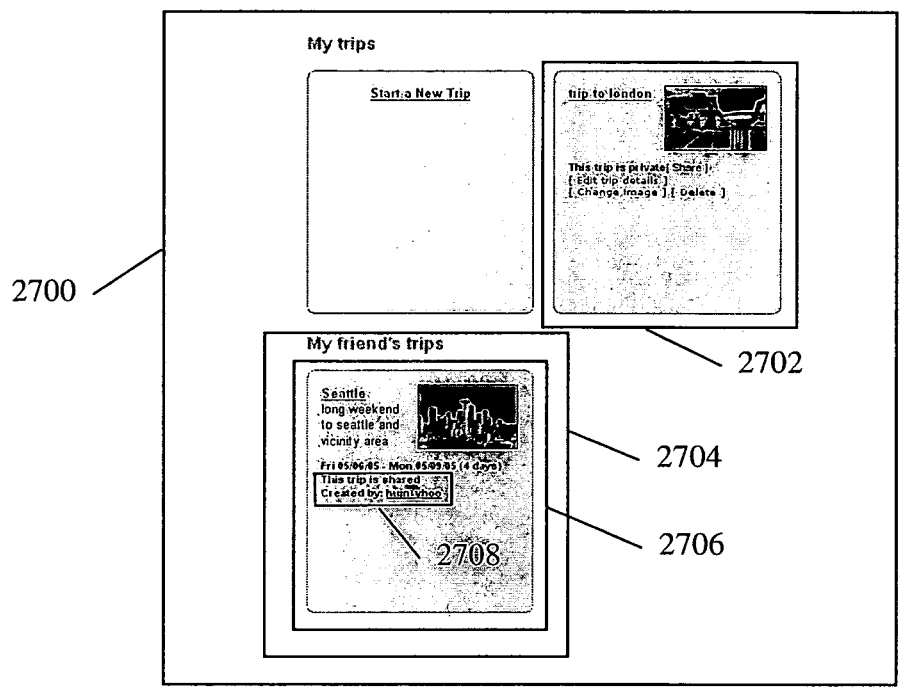
FIG. 27 illustrates an exemplary user interface which includes a trip that has been shared with the user by another user.

FIG. 27 illustrates an exemplary user interface which includes a trip that has been shared with the user by another user. The trip index 2700 shows a trip 2702, created by a first user, which is private. The trip index 2700 also shows a list 2704 of a second user's trips, which includes a trip 2706 created by the second user. The trip 2706 is shared, as indicated by the description 2708, which states "This trip is shared." In this example, the first user does not have access to edit the second user's trip 2704, but in other examples, such access could be provided to other users, e.g., to add comments, items, or otherwise edit trip details.

Figure 28:
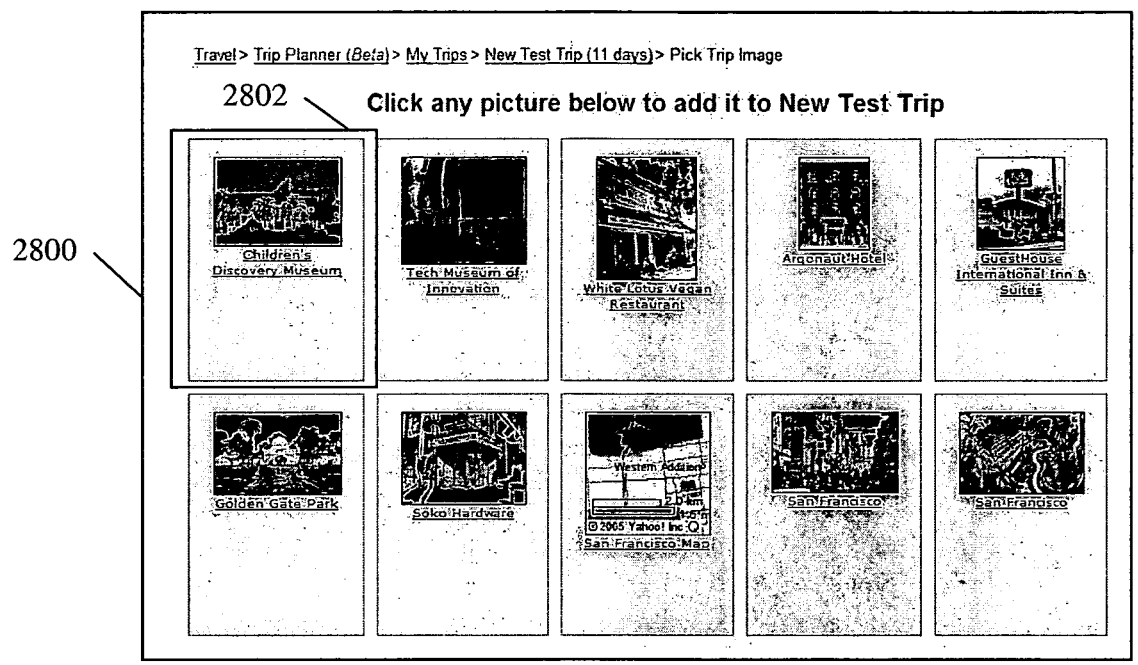
FIG. 28 illustrates an exemplary user interface for selecting an image to be associated with a trip plan.

FIG. 28 illustrates an exemplary user interface for selecting an image to be associated with a trip plan. A Pick Trip Image interface 2800 displays a list of images, including an image 2802. A user may select an image from the list, or may upload or link to photographs or other media objects from their desktop or from a URL. Images can be provided in that way for both trips, as well as items.

It will be appreciated that the above description for clarity has described embodiments of the invention with reference to different functional units. However, it will be apparent that any suitable distribution of functionality between different functional units may be used without detracting from the invention. Hence, references to specific functional units are only to be seen as references to suitable means for providing the described functionality rather than indicative of a strict logical or physical structure or organization.

The invention can be implemented in any suitable form including hardware, software, firmware or any combination of these. Different aspects of the invention may be implemented at least partly as computer software or firmware running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A method comprising:
   receiving, at a computing device, user input from a web page used by a user to create a trip plan, the trip plan comprising content pertaining to an upcoming or past trip;
   providing, by the computing device, a list of destinations to the user;

adding, by the computing device and to the trip plan, via the web page, at least one trip plan item, wherein the at least one trip plan item comprises a location of interest for the trip and is based upon at least one destination selected by the user from the list;

receiving, by the computing device, metadata from the user concerning the at least one trip plan item, wherein the metadata comprises at least one user defined tag describing the at least one trip plan item;

transmitting, by the computing device, a promotion to the user based on information collected or saved into the trip plan;

associating, by the computing device, the metadata with the at least one trip plan item, wherein the at least one trip plan item is retrievable by searching for the at least one user defined tag;

transmitting, by the computing device, the trip plan, including the at least one trip plan item and the metadata, to at least one other user, wherein the transmitting comprises generating a web page that represents the trip plan and providing the web page to a browser associated with the at least one other user or providing a link to the web page to the at least one other user;

suggesting, by the computing device, additional tags for the metadata based on previously used tags by the at least one other user; and generating, by the computing device, a map view of the trip plan, the map view including an icon of the at least one trip plan item displayed on the map in a position based upon an address associated with the at least one trip plan item, wherein a single icon is displayed for at least two trip plan items if the at least two trip plan items are located in a region of less than a defined area.

2. The method of claim 1, wherein the list comprises a list of hotels, tourist attractions, restaurants, or combinations thereof.

3. The method of claim 1, wherein the list further comprises at least one destination provided by the user.

4. The method of claim 1, wherein the list comprises at least one destination provided by a travel guide.

5. The method of claim 1, wherein the list comprises at least one destination parsed from selected text on a web page.

6. The method of claim 1, wherein the metadata comprises at least one note.

7. The method of claim 1, wherein the metadata comprises at least one description.

8. The method of claim 1, wherein the metadata comprises at least one date.

9. The method of claim 1, wherein the metadata comprises at least one category.

10. The method of claim 1, further comprising:
generating a schedule view of the trip plan, wherein the schedule view comprises the at least one trip plan item.

11. The method of claim 10, wherein the schedule view is sorted by the metadata associated with the at least one trip plan item.

12. The method of claim 10, further comprising:
refining the schedule view of the trip plan to generate a refined view, wherein the refined view includes the at least one trip plan item in response to the metadata associated with the at least one trip plan item having a user-specified value.

13. The method of claim 1, wherein the trip plan is associated with at least one tag, and the trip plan can be retrieved by searching for the at least one tag.

14. The method of claim 1, wherein the at least one other user is in a set of specified users, and the set of specified users is received from the user.

15. The method of claim 1, further comprising:
causing a display of promotional items based upon the trip plan.

16. The method of claim 15, wherein the promotional items comprise hotels within a defined distance of the at least one trip plan item, airline flights associated with the location of the at least one trip plan item, or combinations thereof.

17. The method of claim 1, further comprising the steps of:
receiving selection by a user of at least one trip plan item displayed on the map; and
adding details concerning the at least one trip plan item to the map view.

18. The method of claim 1, further comprising the steps of:
receiving selection by a user of at least one travel guide item displayed on the map; and
adding the at least one travel guide item to the trip plan.

19. The method of claim 1, further comprising the step of:
adding the map view to the trip plan.

20. The method of claim 1, further comprising the step of:
generating a print view of the trip plan, wherein the print view includes at least one trip plan item, and the print view is in a format suitable for printing on paper.

21. The method of claim 1, further comprising:
receiving at least one edited trip detail from the at least one other user via the web server; and
modifying the trip plan to include the at least one edited trip detail.

22. The method of claim 21, wherein the at least one edited trip detail comprises an added comment or an added trip plan item.

* * * * *